(12) United States Patent
Yoshida et al.

(10) Patent No.: US 12,519,356 B2
(45) Date of Patent: Jan. 6, 2026

(54) ROTOR AND ROTATING ELECTRIC MACHINE

(71) Applicant: DENSO CORPORATION, Kariya (JP)

(72) Inventors: Haruo Yoshida, Kariya (JP); Ritsuro Hiramatsu, Kariya (JP); Toshihiro Uchida, Kariya (JP)

(73) Assignee: DENSO CORPORATION, Kariya (JP)

( * ) Notice: Subject to any disclaimer, the term of this patent is extended or adjusted under 35 U.S.C. 154(b) by 288 days.

(21) Appl. No.: 18/133,151

(22) Filed: Apr. 11, 2023

(65) Prior Publication Data

US 2023/0246496 A1 Aug. 3, 2023

Related U.S. Application Data

(63) Continuation of application No. PCT/JP2021/034893, filed on Sep. 22, 2021.

(30) Foreign Application Priority Data

Oct. 15, 2020 (JP) .................................. 2020-173869
Aug. 24, 2021 (WO) .................. PCT/JP2021/030888

(51) Int. Cl.
*H02K 1/276* (2022.01)
*H02K 21/16* (2006.01)

(52) U.S. Cl.
CPC ........... *H02K 1/2773* (2013.01); *H02K 21/16* (2013.01)

(58) Field of Classification Search
CPC ........ H02K 1/2773; H02K 21/16; H02K 1/02; H02K 2201/06; H02K 2213/03; H02K 1/2766

See application file for complete search history.

(56) References Cited

U.S. PATENT DOCUMENTS

| | | | |
|---|---|---|---|
| 2015/0214797 A1* | 7/2015 | Sakamoto | H02K 21/24 310/44 |
| 2015/0270751 A1* | 9/2015 | Cao | H02K 1/2773 310/156.56 |
| 2015/0303751 A1* | 10/2015 | Ekin | H02K 1/28 310/43 |

FOREIGN PATENT DOCUMENTS

| | | |
|---|---|---|
| CN | 106469953 A | 3/2017 |
| JP | 2006-158008 A | 6/2006 |
| JP | 2013-51837 A | 3/2013 |
| JP | 2016-72995 A | 5/2016 |
| JP | 2016-167907 A | 9/2016 |
| JP | 2017-70031 A | 4/2017 |
| WO | 2018/198866 A1 | 11/2018 |

\* cited by examiner

*Primary Examiner* — Christopher M Koehler
*Assistant Examiner* — Riley Owen Stout
(74) *Attorney, Agent, or Firm* — Oliff PLC

(57) ABSTRACT

A rotor is configured such that end portions of permanent magnets protrude, as protruding portions, from axial end faces of a rotor core which are formed as flat surfaces, so as to minimize leakage of magnetic flux of embedded magnet portions of the permanent magnets from the axial end faces of the rotor core; the embedded magnet portions of the permanent magnets are located in the rotor core.

15 Claims, 18 Drawing Sheets

ROTOR AND ROTATING ELECTRIC MACHINE

CROSS-REFERENCE TO RELATED APPLICATIONS

The present application is a continuation application of International Application No. PCT/JP2021/034893 filed on Sep. 22, 2021, which is based on and claims priority from Japanese Patent Application No. 2020-173869 filed on Oct. 15, 2020 and International Application No. PCT/JP2021/030888 filed on Aug. 24, 2021. The entire contents of these applications are incorporated by reference into the present application.

BACKGROUND

1 Technical Field

The present disclosure relates to interior permanent magnet rotors and rotating electric machines.

2 Description of Related Art

Rotating electric machines have been well known which employ Interior Permanent Magnet (IPM) rotors. The IPM rotors have permanent magnets embedded in a rotor core. The IPM rotors are configured to generate both magnet torque by the permanent magnets and reluctance torque by outer core portions located radially outside the permanent magnets. In such IPM rotors, depending on the manner of arranging the permanent magnets, leakage magnetic flux tends to be generated at end portions of the permanent magnets; the end portions of the permanent magnets are located on axial end faces of the rotor core. In particular, if leakage of effective magnetic flux occurs, the torque performance will be lowered. Therefore, various proposals have conventionally been made regarding countermeasures against this problem.

SUMMARY

The countermeasures disclosed in the related art (see, for example, JP2016072995A) require changing the shape of the axial end faces of the rotor core which are generally flat surfaces, such as forming relatively large steps in the axial end faces. Consequently, the manufacture of the rotor core may become complicated.

In consideration of the concerns about the above countermeasures, the inventors of the present application have investigated whether it is possible to suppress leakage of the effective magnetic flux of the permanent magnets by other simpler countermeasures.

The present disclosure has been accomplished based on the results of the investigation by the inventors of the present application.

According to the present disclosure, there is provided a rotor that has a permanent magnet embedded in a magnet-receiving hole of a rotor core. The rotor core has axial end faces formed as flat surfaces. The permanent magnet has protruding portions that protrude respectively from the axial end faces of the rotor core. The permanent magnet also has a pair of straight portions and a curved portion that connects radially inner ends of the pair of straight portions. A thickness of the curved portion is smaller than a thickness of the pair of straight portions.

According to the present disclosure, there is also provided a rotating electric machine that includes: a rotor having a permanent magnet embedded in a magnet-receiving hole of a rotor core; and a stator configured to apply a rotating magnetic field to the rotor. The rotor core has axial end faces formed as flat surfaces. The permanent magnet has protruding portions that protrude respectively from the axial end faces of the rotor core. The permanent magnet also has a pair of straight portions and a curved portion that connects radially inner ends of the pair of straight portions. A thickness of the curved portion is smaller than a thickness of the pair of straight portions.

In the above rotor and rotating electric machine according to the present disclosure, at least part of the permanent magnet protrudes from the flat axial end faces of the rotor core to form the protruding portions. Therefore, to leak out from the axial end faces of the rotor core, it would be necessary for magnetic flux generated by an embedded magnet portion of the permanent magnet, which is located in the rotor core, to flow beyond the protruding portions. That is, the lengths of paths through which the magnetic flux generated by the embedded magnet portion may leak out are increased. Consequently, it becomes possible to suppress leakage of the magnetic flux generated by the embedded magnet portion. The magnetic flux generated by the embedded magnet portion of the permanent magnet constitutes effective magnetic flux that contributes to the torque of the rotating electric machine. Therefore, by minimizing leakage of the magnetic flux generated by the embedded magnet portion, it is possible to increase the amount of the effective magnetic flux and thereby improve the torque performance of the rotating electric machine. Moreover, the axial end faces of the rotor core are shaped as general flat surfaces; thus, it becomes possible to realize, with the simple countermeasure of configuring end portions of the permanent magnet to protrude from the axial end faces of the rotor core, suppression of leakage of the magnetic flux generated by the embedded magnet portion. In addition, setting the thickness of the curved portion to be smaller than the thickness of the pair of straight portions, it becomes possible to reduce the amount of a magnet material required for the permanent magnet and thus the weight of the rotor.

DESCRIPTION OF EMBODIMENTS

Hereinafter, an embodiment of a rotor manufacturing apparatus, a rotor manufacturing method and a rotor will be described.

Figure 1:
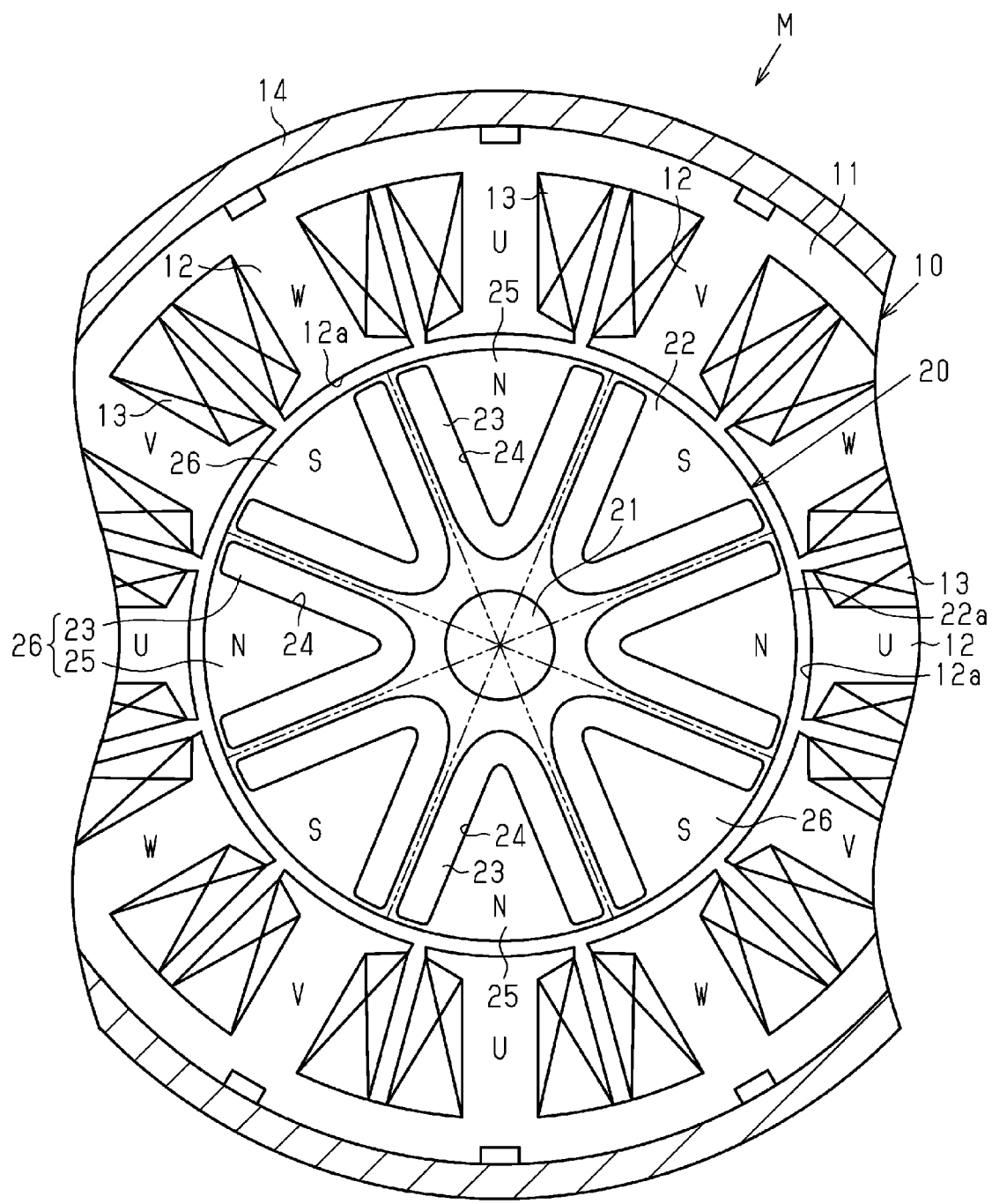
FIG. 1 is a configuration diagram of a rotating electric machine which includes an IPM rotor according to an embodiment.

As shown in FIG. 1, a rotating electric machine M according to the present embodiment is configured as an IPM brushless motor. The rotating electric machine M includes a substantially annular stator 10 and a substantially cylindrical rotor 20 that is rotatably arranged in a space radially inside the stator 10.

The stator 10 includes a substantially annular stator core 11. The stator core 11 is formed of a magnetic metal material. For example, the stator core 11 may be formed by laminating a plurality of magnetic steel sheets in the direction of an axis L1 (see FIG. 3). The stator core 11 has a plurality (more particularly, twelve in the present embodiment) of teeth 12 extending radially inward and arranged at equal intervals in a circumferential direction. All the teeth 12 are identical in shape to each other. Each of the teeth 12 has a substantially T-shaped radially inner end portion (i.e., distal end portion) and a distal end surface 12a formed in an arc shape along an outer circumferential surface of the rotor 20. Windings 13 are wound around the teeth 12 in a concentrated winding manner. The windings 13 are connected in three phases to respectively function as a U-phase, a V-phase and a W-phase as shown in FIG. 1. Upon supply of electric power to the windings 13, the stator 10 generates a rotating magnetic field, thereby driving the rotor 20 to rotate. In the stator 10, an outer circumferential surface of the stator core 11 is fixed to an inner circumferential surface of a housing 14.

The rotor 20 includes a rotating shaft 21, a substantially cylindrical rotor core 22 having the rotating shaft 21 inserted in a central part thereof, and a plurality (more particularly, eight in the present embodiment) of permanent magnets 23 embedded in the rotor core 22. The rotor core 22 is formed of a magnetic metal material. For example, the rotor core 22 may be formed by laminating a plurality of magnetic steel sheets in the direction of the axis L1 shown in FIG. 3. The rotor 20 is rotatably arranged with respect to the stator 10, with the rotating shaft 21 supported by bearings (not shown) provided in the housing 14.

The rotor core 22 has a plurality of magnet-receiving holes 24 for receiving the permanent magnets 23 therein. More particularly, in the present embodiment, eight magnet-receiving holes 24 are formed at equal intervals in the circumferential direction of the rotor core 22. Each of the magnet-receiving holes 24 has a folded substantially V-shape that is convex radially inward. That is, all the magnet-receiving holes 24 are identical in shape to each other. Moreover, each of the magnet-receiving holes 24 is formed to extend over the entire axial length of the rotor core 22.

In the present embodiment, the permanent magnets 23 are implemented by bonded magnets that are formed by molding and solidifying a magnet material; the magnet material is a mixture of a magnet powder and a resin. More specifically, in the present embodiment, the magnet-receiving holes 24 of the rotor core 22 serve as forming molds. The permanent magnets 23 are formed by: filling the magnet material, which has not been solidified, into the magnet-receiving holes 24 of the rotor core 22 by injection molding without any gaps remaining therein; and then solidifying the magnet material in the magnet-receiving holes 24. Consequently, the external shape of the permanent magnets 23 conforms to the shape of the magnet-receiving holes 24 of the rotor core 22. Moreover, in the present embodiment, each of the permanent magnets 23 is formed to partially protrude from a pair of axial end faces 22c and 22d of the rotor core 22 (see FIG. 3 and the like). More specifically, each of the permanent magnets 23 has an embedded magnet portion 23m located in a corresponding one of the magnet-receiving holes 24 of the rotor core 22 and a pair of protruding portions 23x1 and 23y1 that protrude respectively from the axial end faces 22c and 22d of the rotor core 22. The protruding portions 23x1 and 23y1 of the permanent magnets 23 can be easily realized by providing, in forming molds (not shown) for closing the magnet-receiving holes 24 that open to the axial end faces 22c and 22d of the rotor core 22, recesses for forming the protruding portions 23x1 and 23y1. In the present embodiment, a samarium-iron-nitrogen-based (i.e., SmFeN-based) magnet powder is employed as the magnet powder for forming the permanent magnets 23.

It should be noted that other rare-earth magnet powders may alternatively be employed as the magnet powder for forming the permanent magnets 23.

Figure 2:
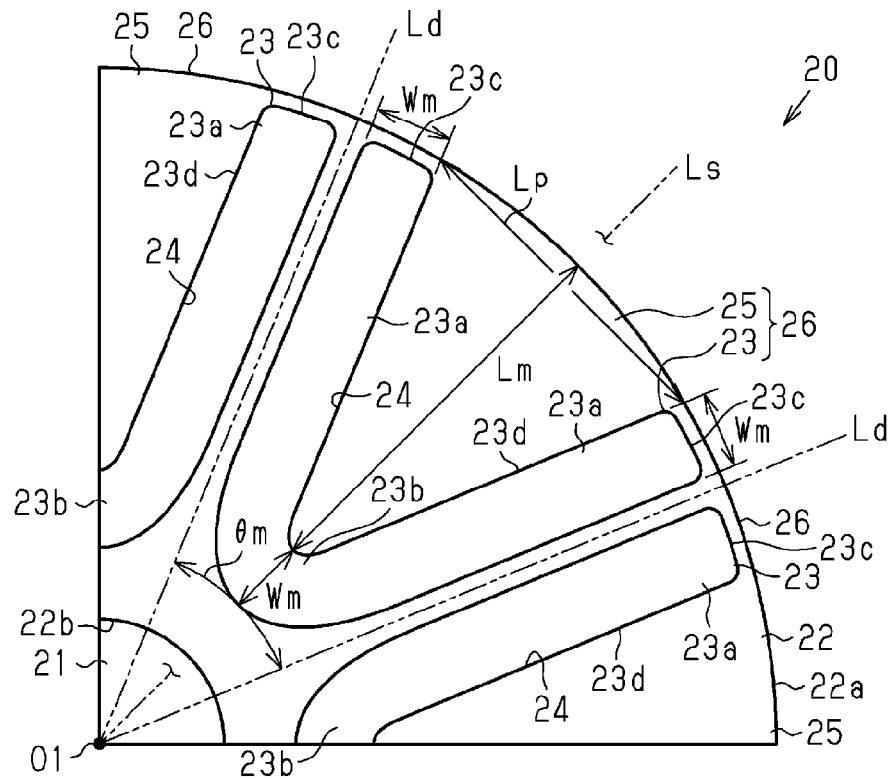
FIG. 2 is a configuration diagram of the rotor according to the embodiment.

Each of the permanent magnets 23 has a folded substantially V-shape that is convex radially inward. More specifically, as shown in FIG. 2, each of the permanent magnets 23 has a shape such that the radially inner ends of a pair of straight portions 23a are connected by a curved portion 23b. The radially outer ends 23c of the pair of straight portions 23a are located near the outer circumferential surface 22a of the rotor core 22. Each of the permanent magnets 23 has a constant thickness Wm at any location in the V-shaped path including the pair of straight portions 23a and the curved portion 23b. Moreover, each of the permanent magnets 23 has an axisymmetric shape with respect to a circumferential centerline Ls thereof passing through an axis center O1 of the rotor 20. Furthermore, the permanent magnets 23 are located in close proximity to magnetic-pole boundary lines Ld each extending between an adjacent pair of the permanent magnets 23 and through the axis center O1 of the rotor 20. The angle between each adjacent pair of the magnetic-pole boundary lines Ld, i.e., the magnetic-pole opening angle θm of each rotor magnetic pole 26 including one of the permanent magnets 23 is 180° in electrical angle.

For each of the V-shaped permanent magnets 23, the distance between the intersection points between extension lines of inside surfaces of the straight portions 23a of the permanent magnet 23 and the outer circumferential surface 22a of the rotor core 22 is defined as a magnetic pole pitch Lp; and the distance on the circumferential centerline Ls of the permanent magnet 23 from the outer circumferential surface 22a of the rotor core 22 to an inside surface of the curved portion 23b of the permanent magnet 23 is defined as an embedding depth Lm. In the present embodiment, each of the permanent magnets 23 is formed to have a deep folded shape such that the embedding depth Lm is larger than the magnetic pole pitch Lp. That is, in the present embodiment, for each of the V-shaped permanent magnets 23, the magnet surface 23d of the permanent magnet 23, which is constituted of the inside surfaces of the straight portions 23a and curved portion 23b of the permanent magnet 23, is set to be larger than the magnet surface of a well-known surface permanent magnet rotor (not shown). Setting the embedding depth Lm to be large, the curved portions 23b of the permanent magnets 23 are located radially inward near a shaft insertion hole 22b which is formed in the central part of the rotor core 22 and in which the rotating shaft 21 is inserted. It should be noted that: the above-described folded shape is merely an example of the shape of the permanent magnets 23; and the permanent magnets 23 may be suitably modified to have other shapes, such as a folded substantially V-shape with a small embedding depth Lm or a folded substantially U-shape with a large curve portion 23b.

Figure 3:
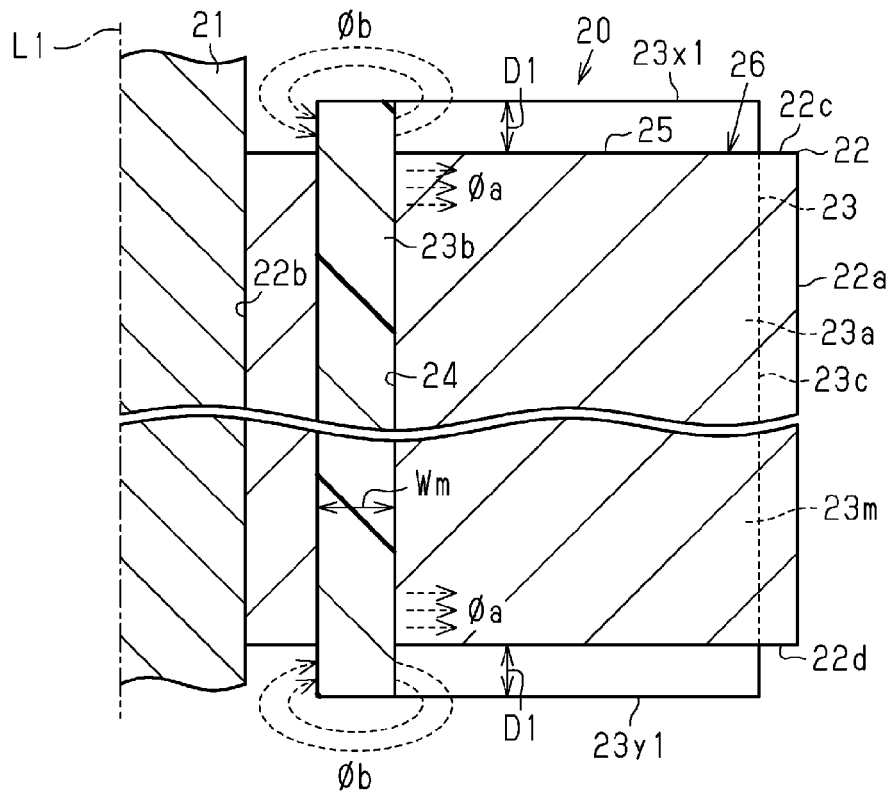
FIG. 3 is a cross-sectional view of the rotor according to the embodiment.
Figure 4:
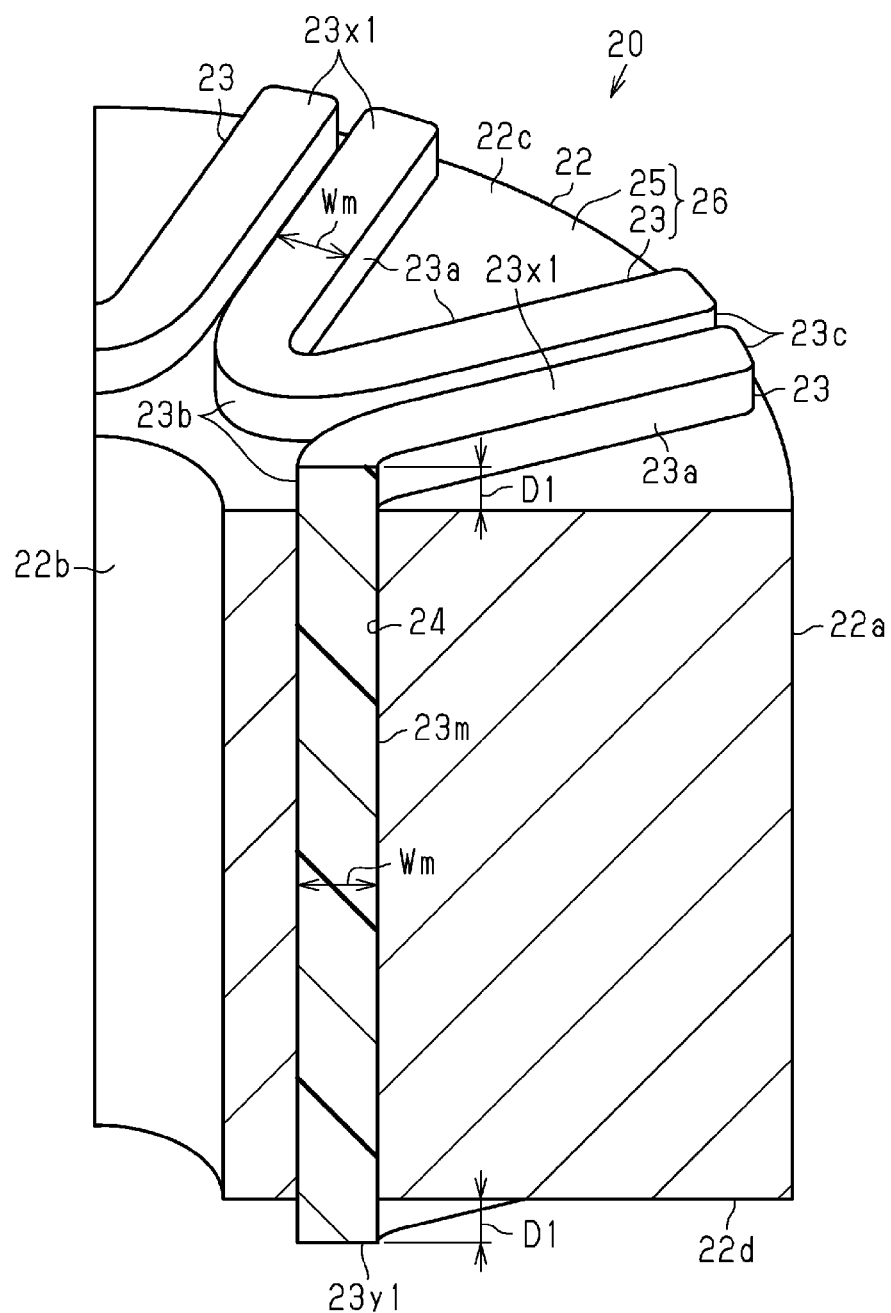
FIG. 4 is a perspective view of the rotor according to the embodiment.

As shown in FIGS. 3 and 4, each of the permanent magnets 23 is provided over the entire axial length of the rotor core 22. The axial end faces 22c and 22d of the rotor core 22 are formed as flat surfaces. Each of the permanent magnets 23 has the protruding portions 23x1 and 23y1 that axially protrude respectively from the axial end faces 22c and 22d of the rotor core 22. The protruding portions 23x1 and 23y1 are formed continuously along the V-shaped path including the straight portions 23a and curved portion 23b of the permanent magnet 23; and the thickness Wm of the protruding portions 23x1 and 23y1 is constant along the V-shape. The protruding portions 23x1 and 23y1 are located respectively on the axial end faces 22c and 22d of the rotor core 22. Moreover, in the present embodiment, the protruding portions 23x1 and 23y1 are formed of the same material as that of the embedded magnet portion 23m of the permanent magnet 23, and are formed continuously and integrally with the embedded magnet portion 23m of the permanent magnet 23 which is located in the corresponding magnet-receiving hole 24 of the rotor core 22.

The protruding portions 23x1 and 23y1 of the permanent magnets 23 are end portions of the permanent magnets 23 which are located on the axial end faces 22c and 22d of the rotor core 22. The protruding portions 23x1 and 23y1 of the permanent magnets 23 function to cause leakage magnetic flux φb as shown in FIG. 3 to be generated thereat; the leakage magnetic flux φb tends to be generated at the end portions of the permanent magnets 23. In other words, with the protruding portions 23x1 and 23y1, more of the magnetic flux generated by the embedded magnet portions 23m of the permanent magnets 23, which are located in the rotor core 22, flows radially without leaking out from the axial end faces 22c and 22d of the rotor core 22; thus, more of the magnetic flux becomes effective magnetic flux φa that contributes to the torque of the rotating electric machine M. The protruding portions 23x1 and 23y1 are formed to have a proper protruding amount D1 from the axial end faces 22c and 22d of the rotor core 22 while enabling an increase in the amount of the effective magnetic flux φa. It should be noted that the protruding amount D1 of the protruding portions 23x1 and 23y1 shown in the drawings may be different from the actual protruding amount D1.

The permanent magnets 23, which are provided mainly in the magnet-receiving holes 24 of the rotor core 22, are magnetized, after solidification of the magnet material, by a magnetizing apparatus (not shown) located outside the rotor core 22, so as to function as genuine permanent magnets. More specifically, in the present embodiment, eight permanent magnets 23 are arranged in the circumferential direction of the rotor core 22 and magnetized so that the polarities of the permanent magnets 23 are alternately different in the circumferential direction. In addition, each of the permanent magnets 23 is magnetized in its thickness direction.

Those portions of the rotor core 22 which are located on the inner side of the folded substantially V-shape of the permanent magnets 23 and radially outside the permanent magnets 23 function as outer core portions 25 facing the stator 10 to generate reluctance torque. When viewed along the axial direction, each of the outer core portions 25 has a substantially triangular shape with one vertex oriented toward the central part of the rotor 20. In the present embodiment, the rotor 20 has eight rotor magnetic poles 26 each including a corresponding one of the eight permanent magnets 23 and a corresponding one of the outer core portions 25 which is surrounded by the corresponding V-shaped permanent magnet 23. As shown in FIG. 1, the rotor magnetic poles 26 function as N poles and S poles alternately in the circumferential direction. The rotor 20 having the rotor magnetic poles 26 as described above can properly generate both magnet torque and reluctance torque.

Next, operation of the rotor 20 of the rotating electric machine M according to the present embodiment will be described.

In the rotor 20 according to the present embodiment, the permanent magnets 23 embedded in the rotor core 22 have their respective end portions protruding, as the protruding portions 23x1 and 23y1, from the axial end faces 22c and 22d of the rotor core 22 respectively on opposite axial sides of the rotor core 22. Since the end portions of the permanent magnets 23 are configured as the protruding portions 23x1 and 23y1, the leakage magnetic flux φb generated at the end portions of the permanent magnets 23 will be concentrated on the protruding portions 23$x$1 and 23$y$1. Moreover, for the embedded magnet portions 23$m$ of the permanent magnets 23 which are located in the rotor core 22, the paths through which the magnetic flux generated by the embedded magnet portions 23$m$ may leak out from the axial end faces 22$c$ and 22$d$ of the rotor core 22 are extended beyond the protruding portions 23$x$1 and 23$y$1; therefore, the lengths of the paths of the magnetic flux are increased. Consequently, it becomes possible to suppress the magnetic flux generated by the embedded magnet portions 23$m$ of the permanent magnets 23 from leaking out from the axial end faces 22$c$ and 22$d$ of the rotor core 22; thus, it becomes possible for the magnetic flux generated by the embedded magnet portions 23$m$ to radially flow through the rotor core 22 over the entire axial length thereof. As a result, most of the magnetic flux generated by the embedded magnet portions 23$m$ becomes the effective magnetic flux φa that contributes to the torque of the rotating electric machine M; thus, it becomes possible to increase the amount of the effective magnetic flux φa.

Figure 5A:
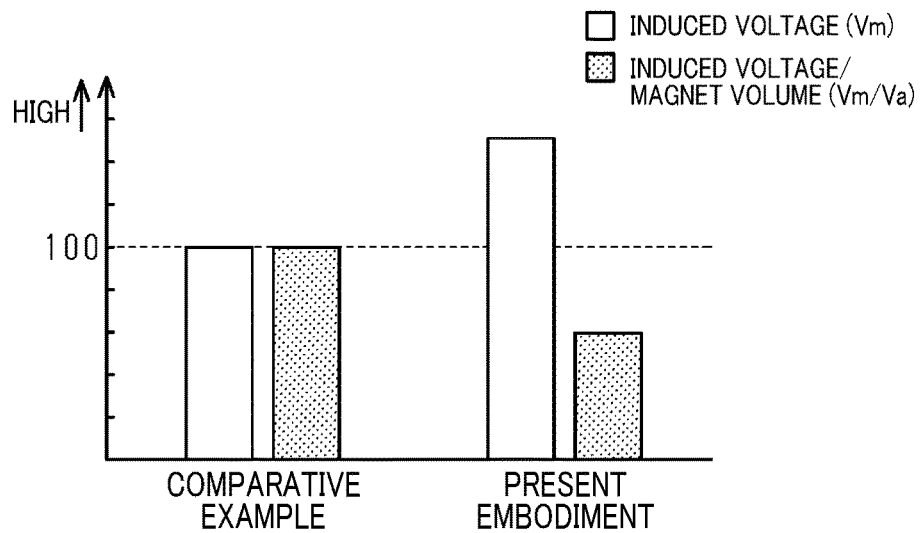
FIGS. 5(a) to 5(c) are explanatory diagrams for explaining the characteristics of the rotor according to the embodiment.
Figure 5B:
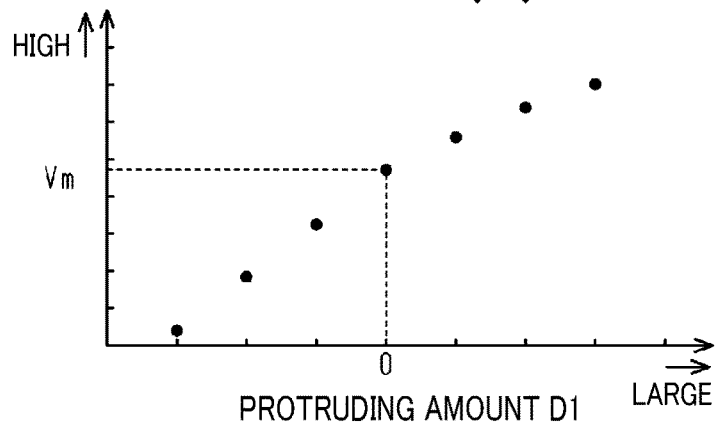
Figure 5C:
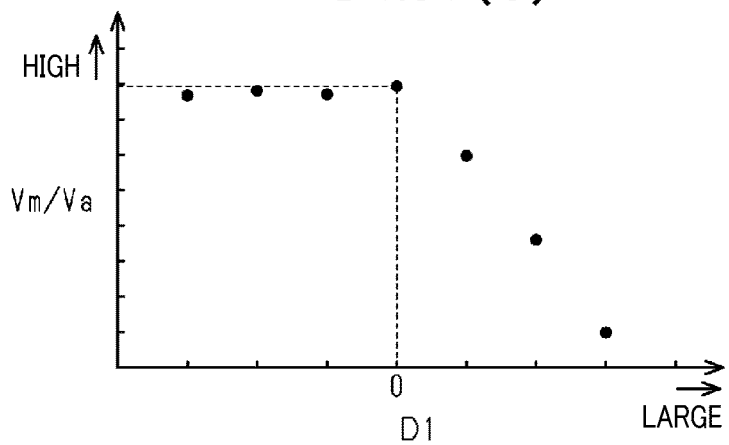

FIG. 5($a$) shows the results of a comparison between the rotor 20 according to the present embodiment and a rotor according to a comparative example. The rotor 20 according to the present embodiment is configured so that the end portions of the permanent magnets 23 protrude, as the protruding portions 23$x$1 and 23$y$1, from the axial end faces 22$c$ and 22$d$ of the rotor core 22 respectively on opposite axial sides of the rotor core 22. In contrast, the rotor according to the comparative example has a conventionally well-known configuration where the end portions of the permanent magnets 23 do not protrude from the axial end faces 22$c$ and 22$d$ of the rotor core 22. The comparison is made in terms of the induced voltage Vm generated in the rotating electric machine M and the quotient (Vm/Va) of the induced voltage Vm divided by the volume Va of the permanent magnets 23; and the parameters Vm and (Vm/Va) are shown in relative values that are 100 in the comparative example.

The rotor 20 according to the present embodiment is considerably higher in the induced voltage Vm than the rotor according to the comparative example. This is because in the rotor 20 according to the present embodiment, the leakage magnetic flux φb is generated at the protruding portions 23$x$1 and 23$y$1 of the permanent magnets 23; therefore, most of the magnetic flux generated by the embedded magnet portions 23$m$ of the permanent magnets 23 becomes the effective magnetic flux (pa and thus the amount of the effective magnetic flux φa is increased. FIG. 5($b$) shows the relationship between the protruding amount D1 of the protruding portions 23$x$1 and 23$y$1 and the induced voltage Vm. As can be seen from FIG. 5($b$), setting the protruding amount D1 of the protruding portions 23$x$1 and 23$y$1 to be larger than zero, i.e., configuring the end portions of the permanent magnets 23 to protrude from the axial end faces 22$c$ and 22$d$ of the rotor core 22, the amount of the effective magnetic flux φa increases and thus the induced voltage Vm also increases. On the other hand, with increase in the magnet volume Va due to the provision of the protruding portions 23$x$1 and 23$y$1 in the permanent magnets 23, the rotor 20 according to the present embodiment becomes lower in the induced voltage/magnet volume (Vm/Va) than the rotor according to the comparative example. FIG. 5($c$) shows the relationship between the protruding amount D1 of the protruding portions 23$x$1 and 23$y$1 and the induced voltage/magnet volume (Vm/Va). As can be seen from FIG. 5($c$), setting the protruding amount D1 of the protruding portions 23$x$1 and 23$y$1 to be larger than zero, the magnet volume Va increases and thus the induced voltage/magnet volume (Vm/Va) decreases. Therefore, the protruding amount D1 of the protruding portions 23$x$1 and 23$y$1 is set properly in consideration of the above relationships of the protruding amount D1 with the induced voltage Vm and the induced voltage/magnet volume (Vm/Va). Moreover, with increase in the protruding amount D1, the weight of the rotor 20 and the amount of the magnet material for forming the permanent magnets 23 also increase; therefore, it is preferable to set the protruding amount D1 properly taking into account this fact as well.

Figure 6:
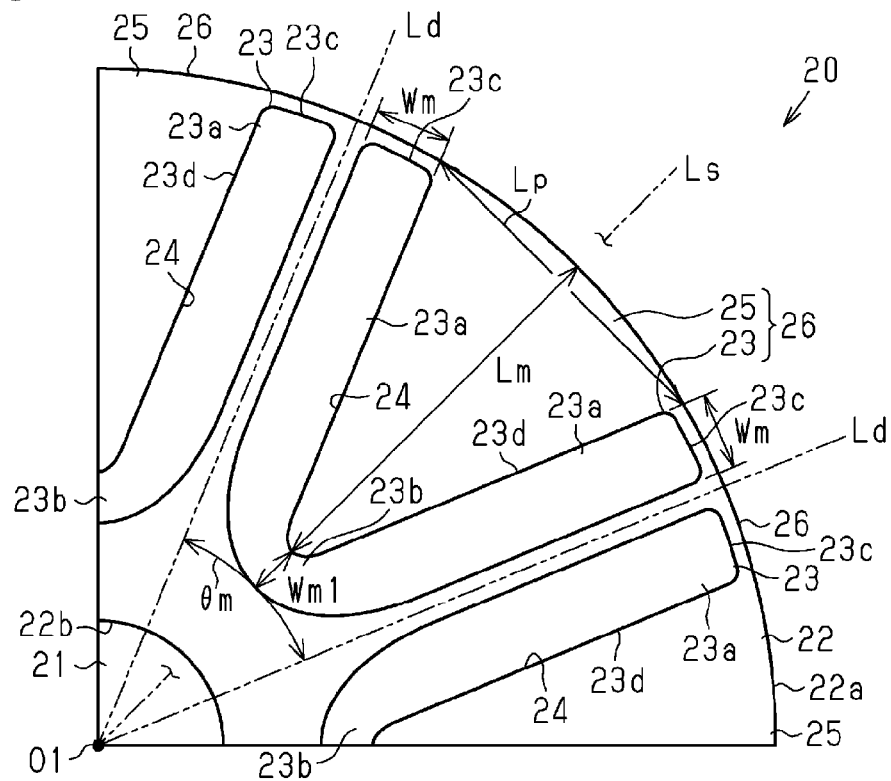
FIG. 6 is a configuration diagram of a rotor obtained by partially changing the shape of the rotor according to the embodiment.
Figure 7:
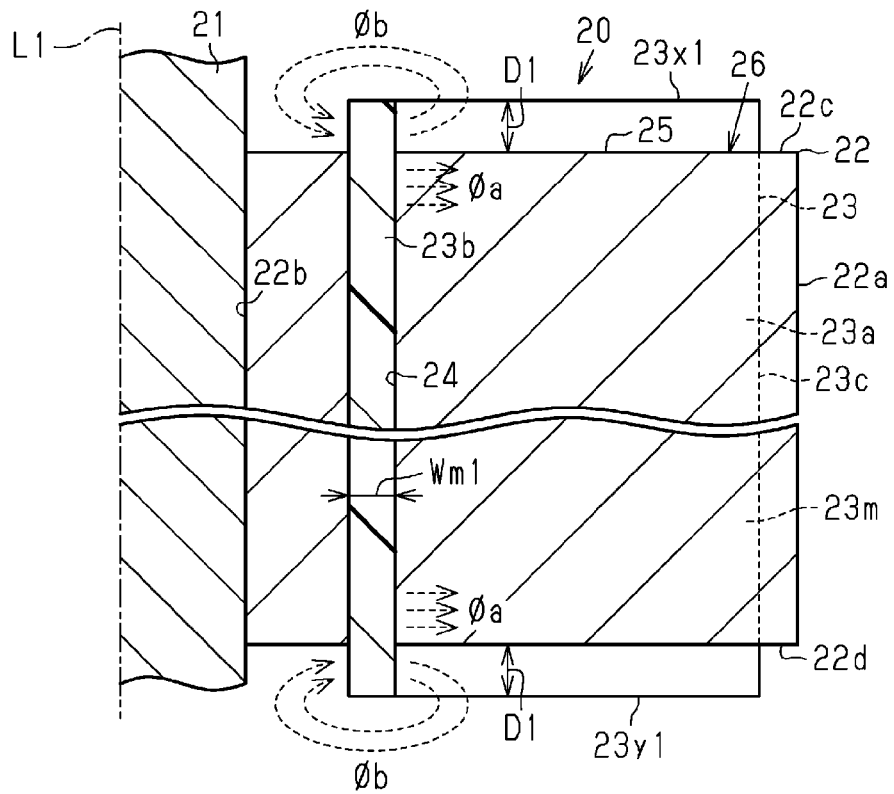
FIG. 7 is a cross-sectional view of the rotor obtained by partially changing the shape of the rotor according to the embodiment.
Figure 8:
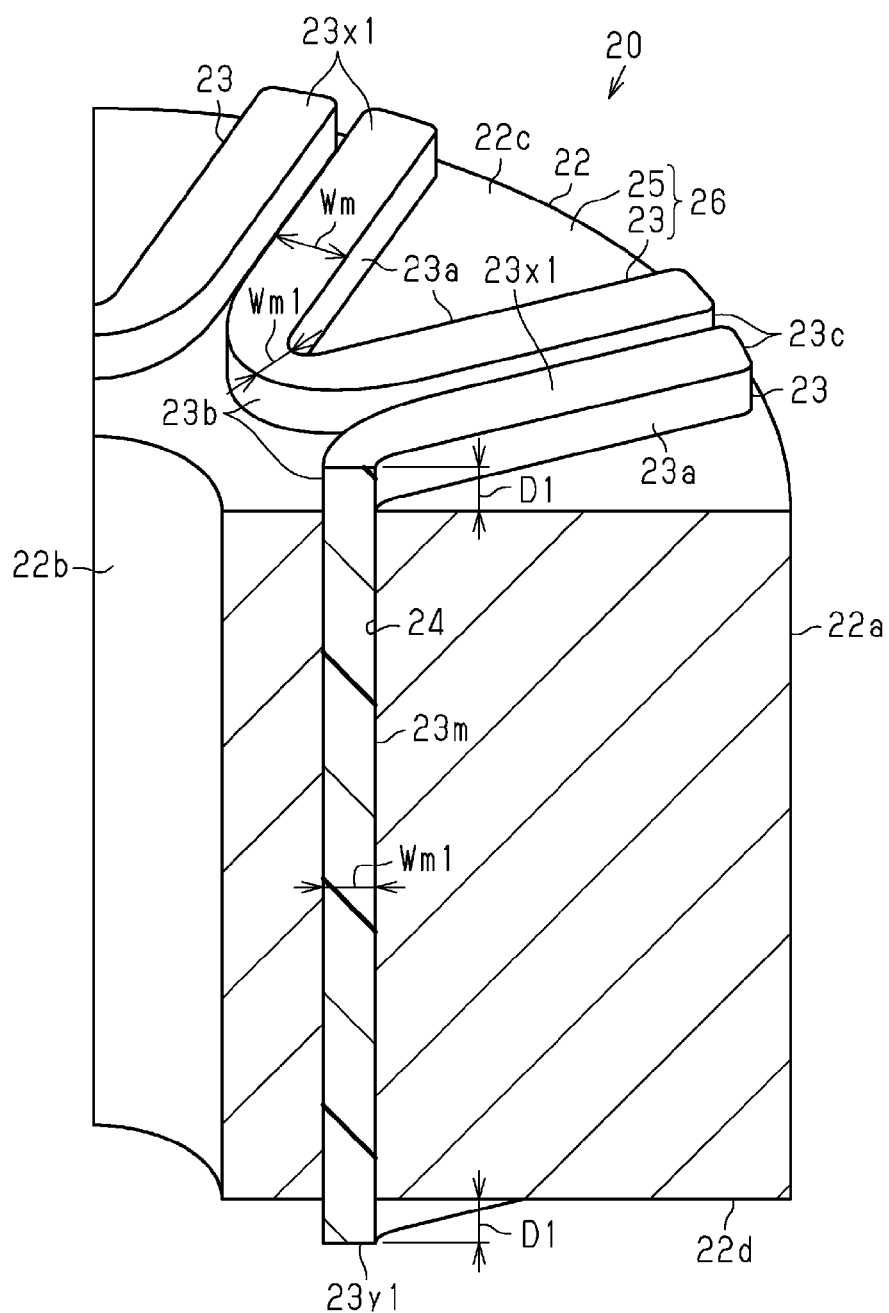
FIG. 8 is a perspective view of the rotor obtained by partially changing the shape of the rotor according to the embodiment.

In the above-described rotor 20 according to the present embodiment, in each of the permanent magnets 23, the protruding portions 23$x$1 and 23$y$1 of the permanent magnet 23 are formed continuously and at the constant thickness Wm along the V-shaped path including the straight portions 23$a$ and curved portion 23$b$ of the permanent magnet 23. Alternatively, as shown in FIGS. 6 to 8, in each of the permanent magnets 23, the thickness Wm1 of the curved portion 23$b$ of the permanent magnet 23 may be set to be smaller than the thickness Wm of the straight portions 23$a$ of the permanent magnet 23.

Figure 9A:
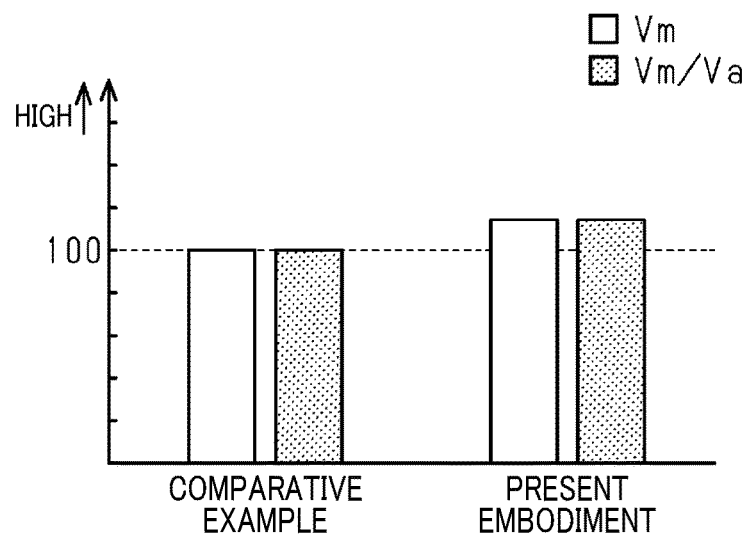
FIGS. 9(a) to 9(c) are explanatory diagrams for explaining the characteristics of the rotor obtained by partially changing the shape of the rotor according to the embodiment.
Figure 9B:
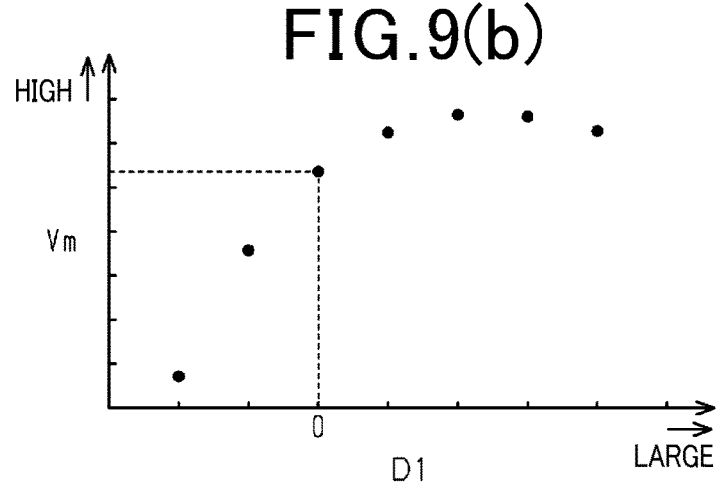
Figure 9C:
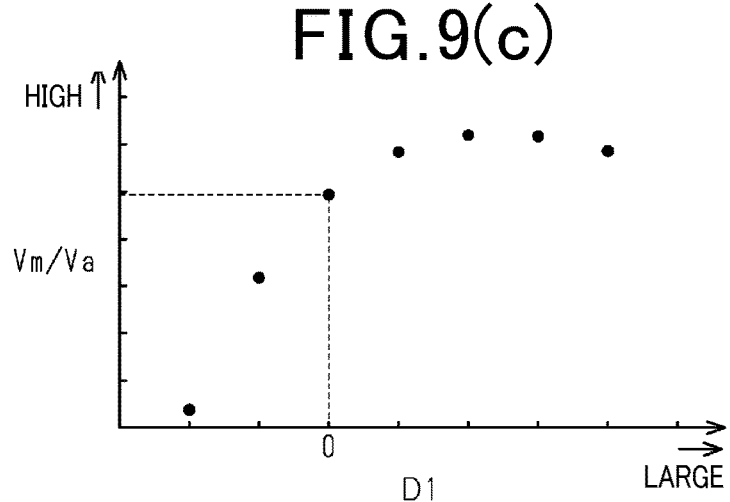

FIG. 9($a$) shows the results of a comparison between the rotor 20 according to the present embodiment having the thickness Wm1 of the curved portions 23$b$ of the permanent magnets 23 slightly reduced and the rotor according to the comparative example.

As can be seen from FIG. 9($a$), the rotor 20 according to the present embodiment is higher in both the induced voltage Vm and the induced voltage/magnet volume (Vm/Va) than the rotor according to the comparative example. The larger the thickness of the protruding portions 23$x$1 and 23$y$1 of the permanent magnets 23, the longer the paths of the magnetic flux of the embedded magnet portions 23$m$ of the permanent magnets 23 leaking out from the axial end faces 22$c$ and 22$d$ of the rotor core 22 become and thus the more effectively leakage of the magnetic flux can be suppressed. Moreover, the amount of the leakage magnetic flux is less at the curved portions 23$b$ of the permanent magnets 23 than at the straight portions 23$a$ of the permanent magnets 23; therefore, the thickness Wm1 of the curved portions 23$b$ of the permanent magnets 23 can be slightly reduced. In other words, in the present embodiment, the thickness Wm1 of the curved portions 23$b$ of the permanent magnets 23 is suitably changed so that the rotor 20 according to the present embodiment is higher in both the induced voltage Vm and the induced voltage/magnet volume (Vm/Va) than the rotor according to the comparative example. FIG. 9($b$) shows the relationship between the protruding amount D1 of the protruding portions 23$x$1 and 23$y$1 and the induced voltage Vm. As can be seen from FIG. 9($b$), in the rotor 20 according to the present embodiment having the thickness Wm1 of the curved portions 23$b$ of the permanent magnets 23 slightly reduced, setting the protruding amount D1 of the protruding portions 23$x$1 and 23$y$1 to be larger than zero, the amount of the effective magnetic flux φa increases and thus the induced voltage Vm also increases; however, the increase in the induced voltage Vm peaks out at an early stage. FIG. 9($c$) shows the relationship between the protruding amount D1 of the protruding portions 23$x$1 and 23$y$1 and the induced voltage/magnet volume (Vm/Va). As can be seen from FIG. 9($c$), in the rotor 20 according to the present embodiment having the thickness Wm1 of the curved portions 23$b$ of the permanent magnets 23 slightly reduced, setting the protruding amount D1 of the protruding portions 23$x$1 and 23$y$1 to be larger than zero, the induced voltage/magnet volume (Vm/Va) first increases to a certain extent due to the reduction in the magnet volume Va resulting from the reduction in the thickness Wm1 and then gradually decreases. This is the result of minimizing the weight of the permanent magnets 23 while minimizing leakage of the magnetic flux of the embedded magnet portions 23m of the permanent magnets 23 from the axial end faces 22c and 22d of the rotor core 22.

Next, advantageous effects achievable according to the present embodiment will be described.

(1) The end portions of the permanent magnets 23 protrude, as the protruding portions 23x1 and 23y1, from the axial end faces 22c and 22d of the rotor core 22 which are formed as flat surfaces. Therefore, to leak out from the axial end faces 22c and 22d of the rotor core 22, it would be necessary for the magnetic flux generated by the embedded magnet portions 23m of the permanent magnets 23, which are located in the rotor core 22, to flow beyond the protruding portions 23x1 and 23y1. That is, the lengths of the paths through which the magnetic flux generated by the embedded magnet portions 23m may leak out are increased. Consequently, it becomes possible to suppress leakage of the magnetic flux generated by the embedded magnet portions 23m. The magnetic flux generated by the embedded magnet portions 23m of the permanent magnets 23 constitutes the effective magnetic flux φa that contributes to the torque of the rotating electric machine M. Therefore, by minimizing leakage of the magnetic flux generated by the embedded magnet portions 23m, it is possible to increase the amount of the effective magnetic flux φa and thereby improve the torque performance of the rotating electric machine M. Moreover, the axial end faces 22c and 22d of the rotor core 22 are shaped as general flat surfaces; thus, it becomes possible to realize, with the simple countermeasure of configuring the end portions of the permanent magnets 23 to protrude from the axial end faces 22c and 22d of the rotor core 22, suppression of leakage of the magnetic flux generated by the embedded magnet portions 23m.

(2) The protruding portions 23x1 and 23y1 of the permanent magnets 23 have the same protruding shape from the axial end faces 22c and 22d of the rotor core 22 on both the axial sides of the rotor core 22. Consequently, it becomes possible to maintain good weight balance of the rotor 20.

(3) In each of the permanent magnets 23, the protruding portions 23x1 and 23y1 of the permanent magnet 23 are formed continuously in the extending direction of the V-shape of the permanent magnet 23 along the axial end faces 22c and 22d of the rotor core 22. Consequently, leakage of the magnetic flux generated by the embedded magnet portions 23m of the permanent magnets 23 can be more reliably suppressed over the entire permanent magnets 23; the magnetic flux generated by the embedded magnet portions 23m contributes to the torque of the rotating electric machine M.

(4) The protruding portions 23x1 and 23y1 of the permanent magnets 23 are formed to have a constant protruding amount D1 from the axial end faces 22c and 22d of the rotor core 22. Consequently, leakage of the magnetic flux generated by the embedded magnet portions 23m of the permanent magnets 23 can be suppressed uniformly at each location; the magnetic flux generated by the embedded magnet portions 23m contributes to the torque of the rotating electric machine M.

(5) In each of the permanent magnets 23, the protruding portions 23x1 and 23y1 of the permanent magnet 23 are formed continuously and integrally with the embedded magnet portion 23m of the permanent magnet 23. Therefore, the protruding portions 23x1 and 23y1 and embedded magnet portion 23m of each of the permanent magnets 23 can be easily formed, for example can be formed of the same material at the same time.

(6) The protruding portions 23x1 and 23y1 are provided in all the permanent magnets 23 arranged in the circumferential direction of the rotor 20. Consequently, it becomes possible to suppress, for all the permanent magnets 23, leakage of the magnetic flux generated by the embedded magnet portions 23m of the permanent magnets 23; the magnetic flux generated by the embedded magnet portions 23m contributes to the torque of the rotating electric machine M. Moreover, it also becomes possible to more reliably maintain good weight balance of the rotor 20.

The present embodiment can be modified and implemented as follows. Moreover, the present embodiment and the following modifications can also be implemented in combination with each other to the extent that there is no technical contradiction between them.

The configuration of the protruding portions 23x1 and 23y1, which are the end portions of the permanent magnets 23 protruding from the axial end faces 22c and 22d of the rotor core 22, may be modified as appropriate.

For example, in each of the permanent magnets 23, protruding portions may be formed only at part of the V-shaped path including the straight portions 23a and curved portion 23b of the permanent magnet 23.

Figure 10:
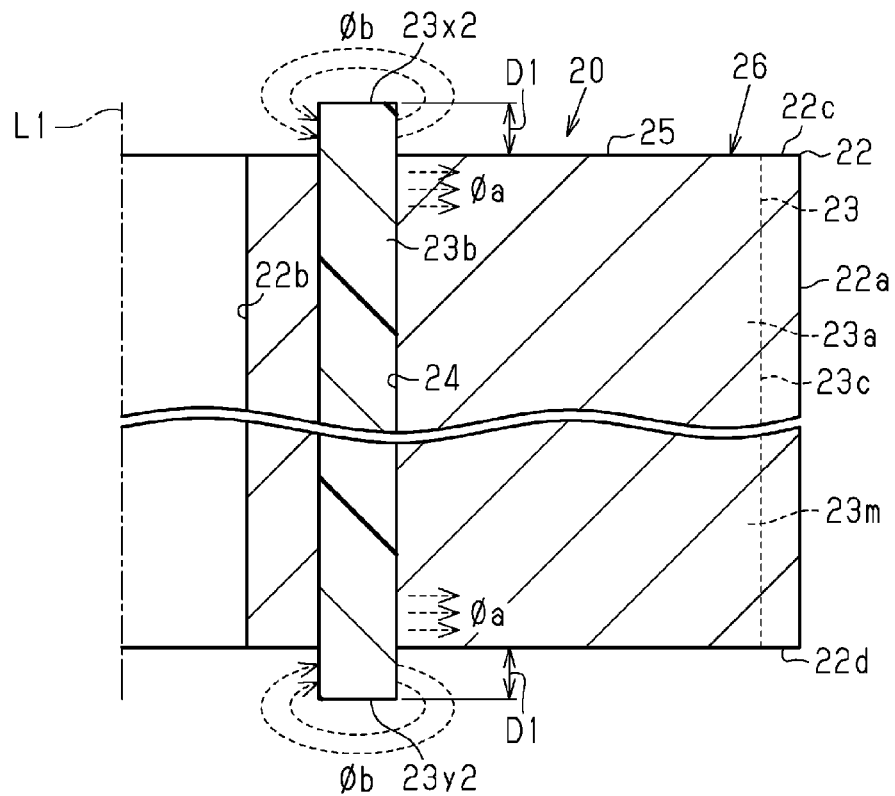
FIG. 10 is a cross-sectional view of a rotor according to a modification.

As shown in FIG. 10, in each of the permanent magnets 23, protruding portions 23x2 and 23y2 may be formed which protrude only at the curved portion 23b of the permanent magnet 23. In addition, the protruding portions 23x2 and 23y2 may be formed similarly on both the axial end faces 22c and 22d of the rotor core 22.

Figure 11:
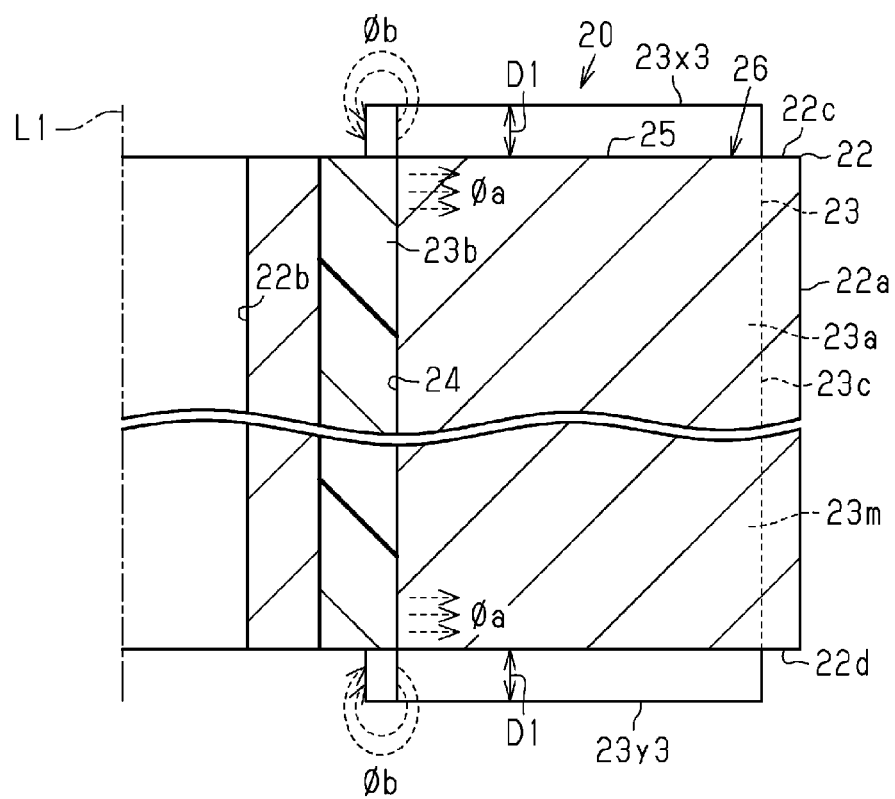
FIG. 11 is a cross-sectional view of a rotor according to another modification.

As shown in FIG. 11, in each of the permanent magnets 23, protruding portions 23x3 and 23y3 may be formed which protrude only at the straight portions 23a of the permanent magnet 23. In addition, the protruding portions 23x3 and 23y3 may be formed similarly on both the axial end faces 22c and 22d of the rotor core 22.

Figure 12:
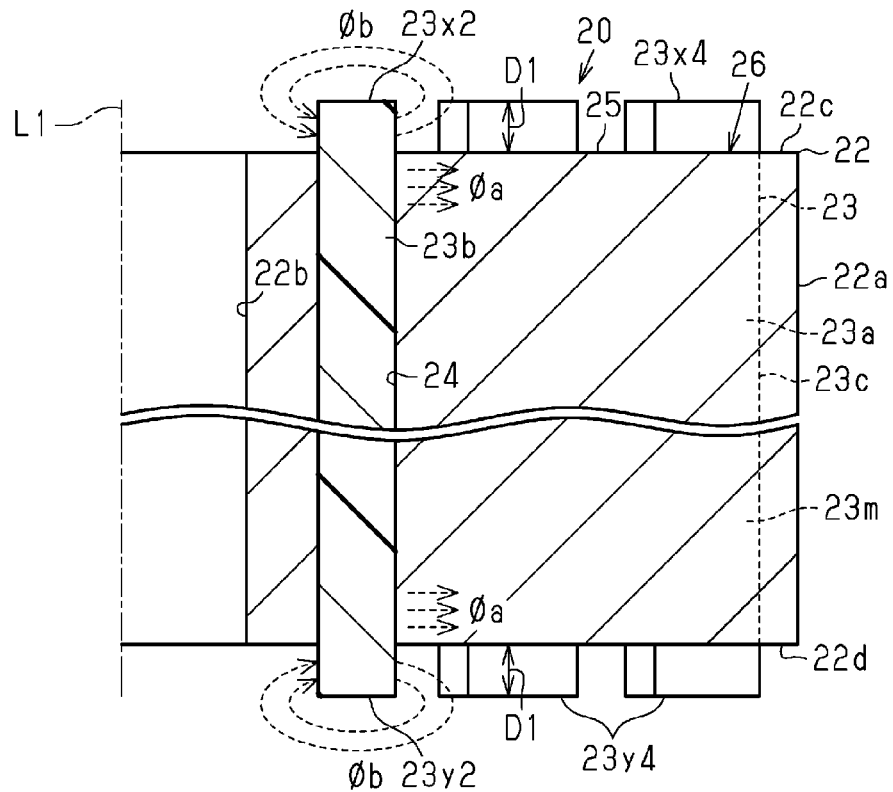
FIG. 12 is a cross-sectional view of a rotor according to another modification.

As shown in FIG. 12, in each of the permanent magnets 23, there may be formed protruding portions 23x4 and 23y4 that protrude only at parts of the straight portions 23a of the permanent magnet 23 as well as the protruding portions 23x2 and 23y2 that protrude only at the curved portion 23b of the permanent magnet 23. In addition, the protruding portions 23x4 and 23y4 as well as the protruding portions 23x2 and 23y2 may be formed similarly on both the axial end faces 22c and 22d of the rotor core 22.

Although not particularly shown in the drawings, in each of the permanent magnets 23, protruding portions may be formed only at half of the V-shape of the permanent magnet 23, i.e., only at one of the straight portions 23a and half of the curved portion 23b of the permanent magnet 23.

In this way, advantageous effects can be achieved such as reduction in the amount of the magnet material required for the permanent magnets 23 and reduction in the weight of the rotor 20.

Moreover, protruding portions having different configurations may be provided respectively on the axial end faces 22c and 22d of the rotor core 22. First, explanation will be given of modifications where protruding portions are provided on only one of the axial end faces 22c and 22d of the rotor core 22.

Figure 13:
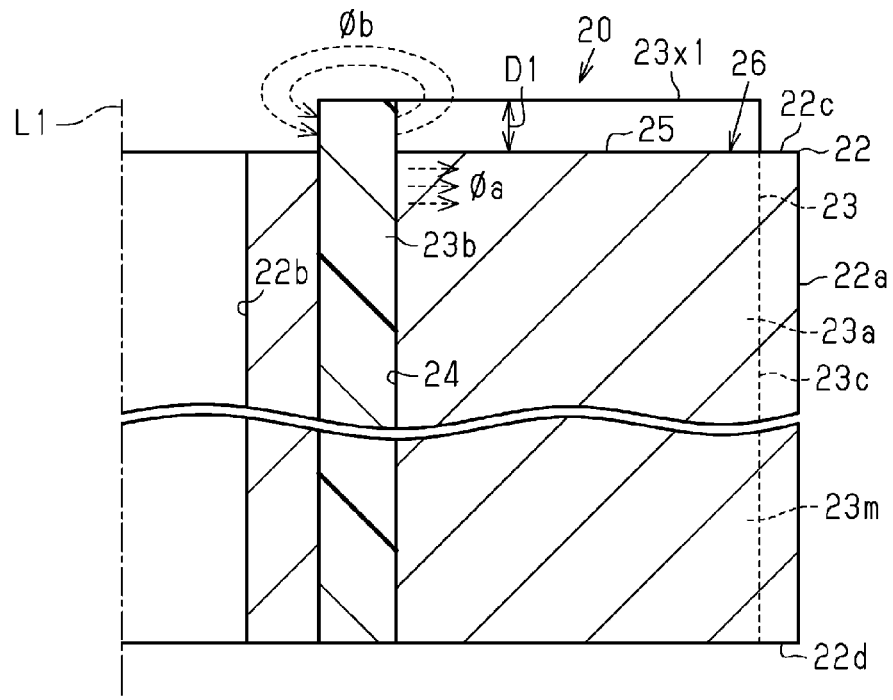
FIG. 13 is a cross-sectional view of a rotor according to another modification.

As shown in FIG. 13, protruding portions 23x1 of the permanent magnets 23 may be provided on, of the axial end faces 22c and 22d of the rotor core 22, only the axial end face 22c. In each of the permanent magnets 23, the protruding portion 23x1 is formed continuously along the V-shaped path of the permanent magnet 23.

Figure 14:
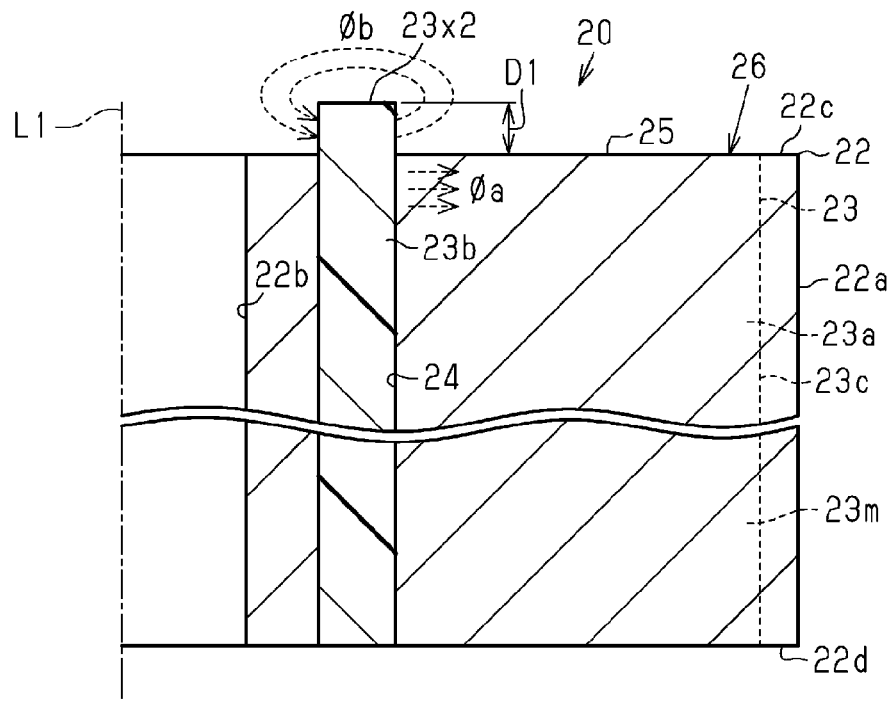
FIG. 14 is a cross-sectional view of a rotor according to another modification.

As shown in FIG. 14, protruding portions 23x2 of the permanent magnets 23 may be provided on, of the axial end faces 22c and 22d of the rotor core 22, only the axial end face 22c. In each of the permanent magnets 23, the protruding portion 23x2 protrudes only at the curved portion 23b of the permanent magnet 23.

Figure 15:
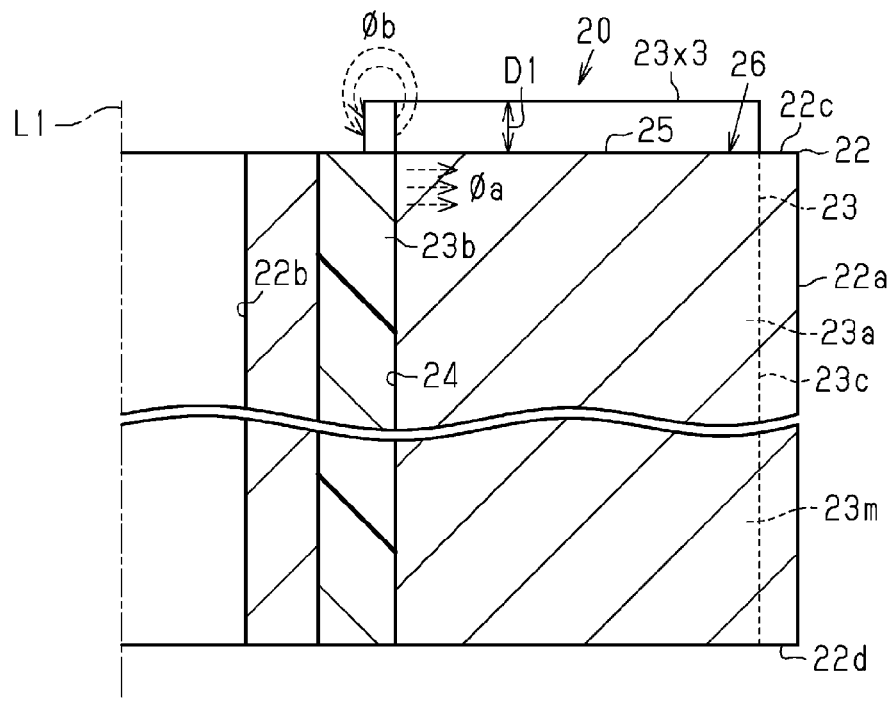
FIG. 15 is a cross-sectional view of a rotor according to another modification.

As shown in FIG. 15, protruding portions 23x3 of the permanent magnets 23 may be provided on, of the axial end faces 22c and 22d of the rotor core 22, only the axial end face 22c. In each of the permanent magnets 23, the protruding portions 23x3 protrude only at the straight portions 23a of the permanent magnet 23.

Figure 16:
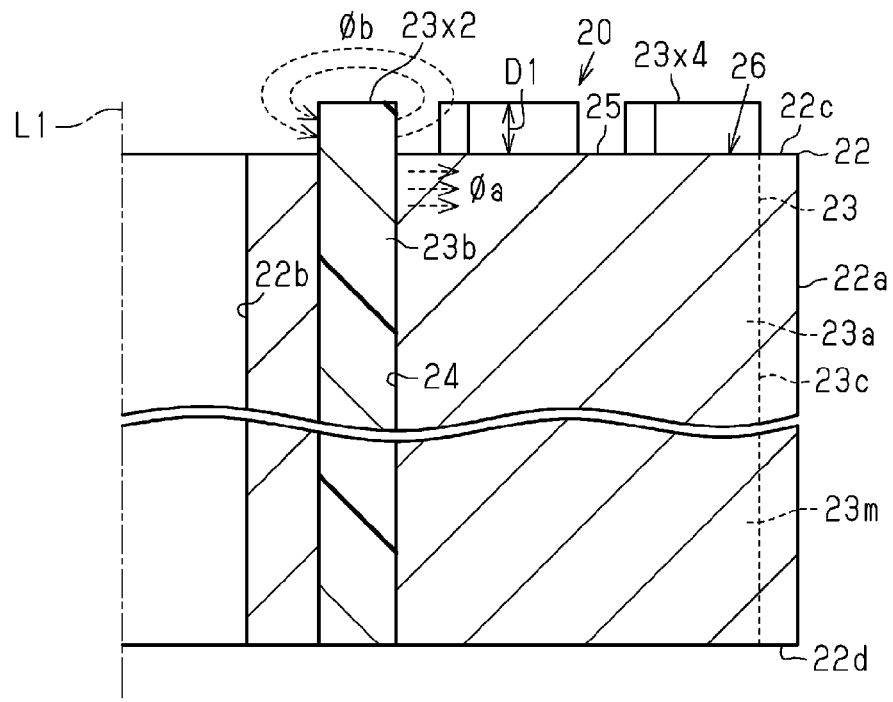
FIG. 16 is a cross-sectional view of a rotor according to another modification.

As shown in FIG. 16, protruding portions 23x2 and 23x4 of the permanent magnets 23 may be provided on, of the axial end faces 22c and 22d of the rotor core 22, only the axial end face 22c. In each of the permanent magnets 23, the protruding portion 23x2 protrudes only at the curved portion 23b of the permanent magnet 23; and the protruding portions 23x4 protrude only at parts of the straight portions 23a of the permanent magnet 23.

In this way, advantageous effects can also be achieved such as reduction in the amount of the magnet material required for the permanent magnets 23 and reduction in the weight of the rotor 20.

Next, explanation will be given of modifications where protruding portions having different configurations are provided respectively on the axial end faces 22c and 22d of the rotor core 22.

Figure 17:
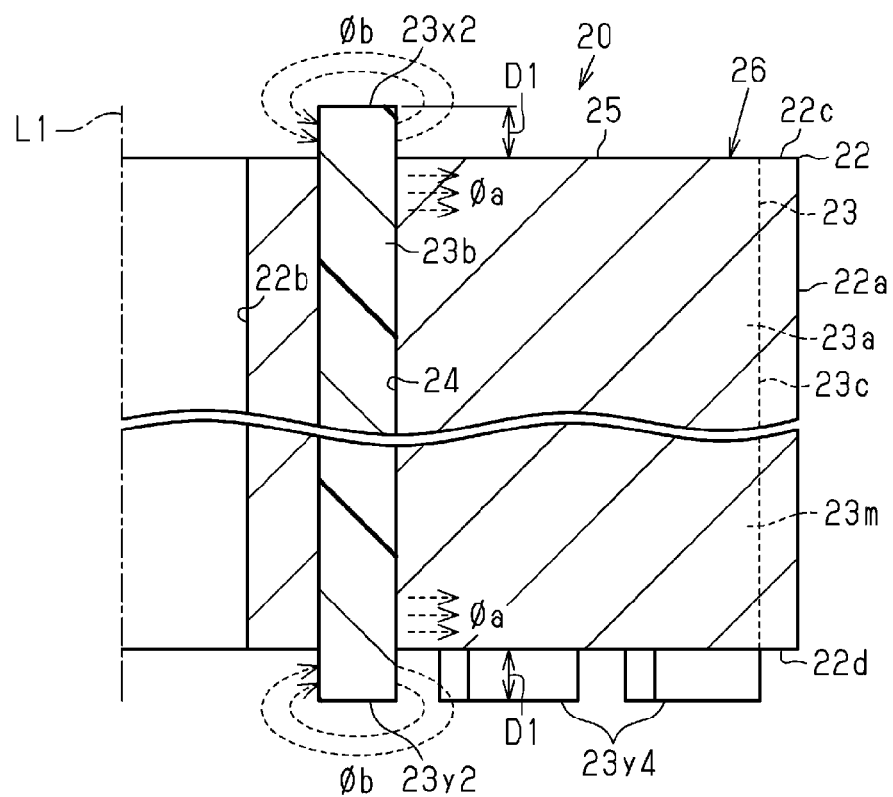
FIG. 17 is a cross-sectional view of a rotor according to another modification.

As shown in FIG. 17, protruding portions 23x2 of the permanent magnets 23 may be provided on, of the axial end faces 22c and 22d of the rotor core 22, only the axial end face 22c; and protruding portions 23y2 and 23y4 of the permanent magnets 23 may be provided on, of the axial end faces 22c and 22d of the rotor core 22, only the axial end face 22d. In each of the permanent magnets 23, the protruding portion 23x2 protrudes only at the curved portion 23b of the permanent magnet 23; the protruding portions 23y2 also protrudes only at the curved portion 23b of the permanent magnet 23; and the protruding portions 23y4 protrude only at parts of the straight portions 23a of the permanent magnet 23.

Figure 18:
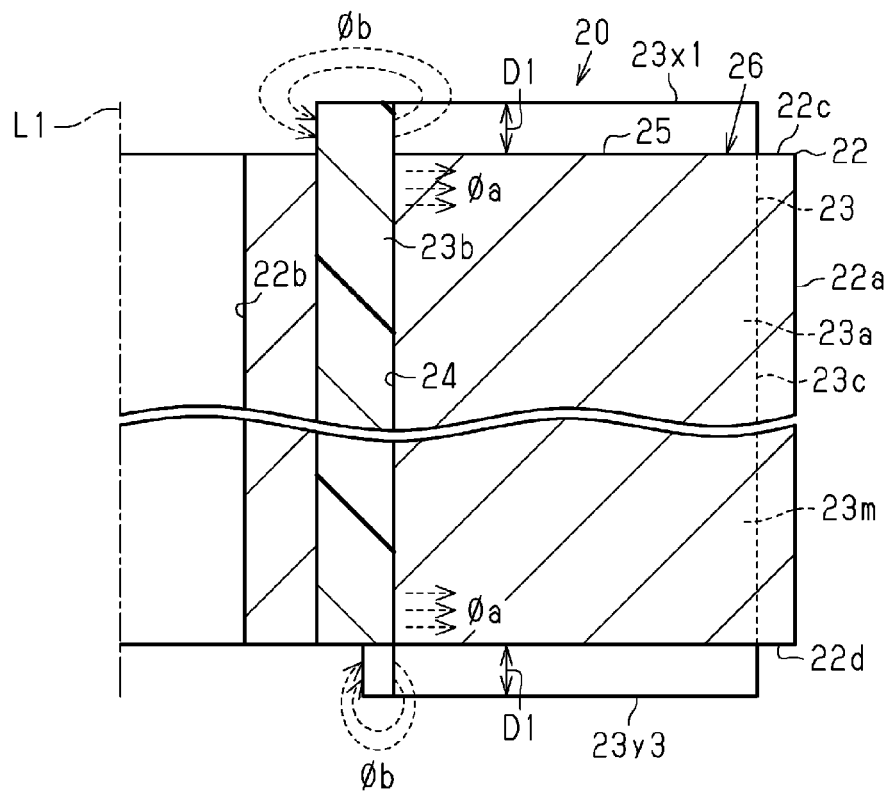
FIG. 18 is a cross-sectional view of a rotor according to another modification.

As shown in FIG. 18, protruding portions 23x1 of the permanent magnets 23 may be provided on, of the axial end faces 22c and 22d of the rotor core 22, only the axial end face 22c; and protruding portions 23y3 of the permanent magnets 23 may be provided on, of the axial end faces 22c and 22d of the rotor core 22, only the axial end face 22d. In each of the permanent magnets 23, the protruding portion 23x1 is formed continuously along the V-shaped path of the permanent magnet 23; and the protruding portions 23y3 protrude only at the straight portions 23a of the permanent magnet 23.

Figure 19:
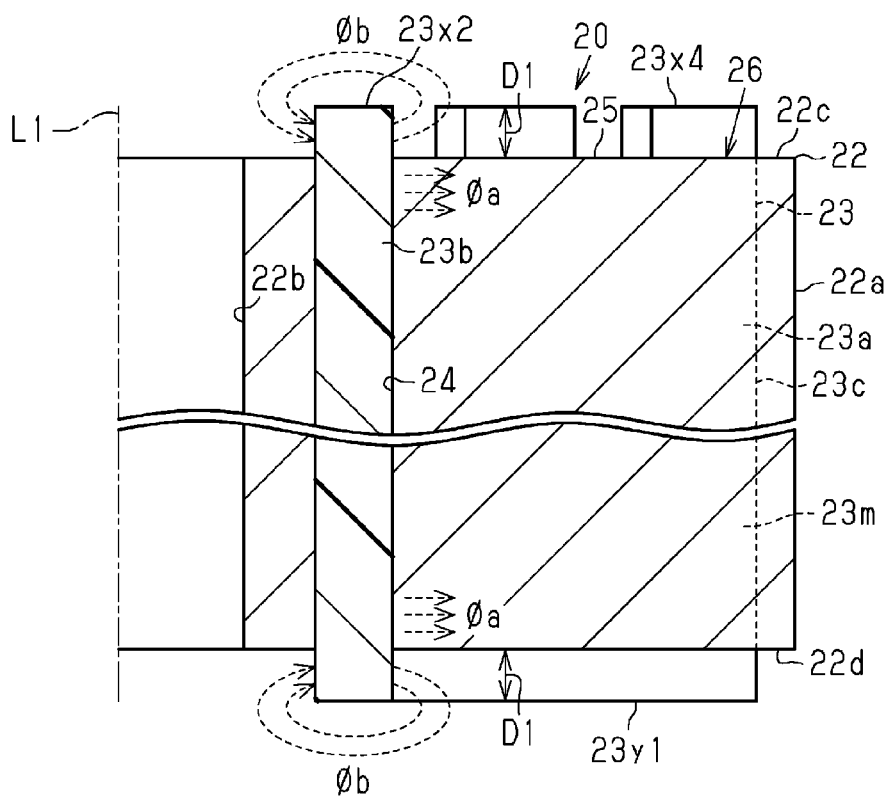
FIG. 19 is a cross-sectional view of a rotor according to another modification.

As shown in FIG. 19, protruding portions 23x2 and 23x4 of the permanent magnets 23 may be provided on, of the axial end faces 22c and 22d of the rotor core 22, only the axial end face 22c; and protruding portions 23y1 of the permanent magnets 23 may be provided on, of the axial end faces 22c and 22d of the rotor core 22, only the axial end face 22d. In each of the permanent magnets 23, the protruding portion 23x2 protrudes only at the curved portion 23b of the permanent magnet 23; the protruding portions 23x4 protrude only at parts of the straight portions 23a of the permanent magnet 23; and the protruding portion 23y1 is formed continuously along the V-shaped path of the permanent magnet 23.

In this way, advantageous effects can be achieved such as increase in the degree of freedom of the external shape of the rotor 20 including the protruding shape of the permanent magnets 23.

Furthermore, in each of the permanent magnets 23, protruding portions may be provided partially in the thickness direction of the permanent magnet 23 perpendicular to the extending direction of the V-shaped path of the permanent magnet 23.

Figure 20:
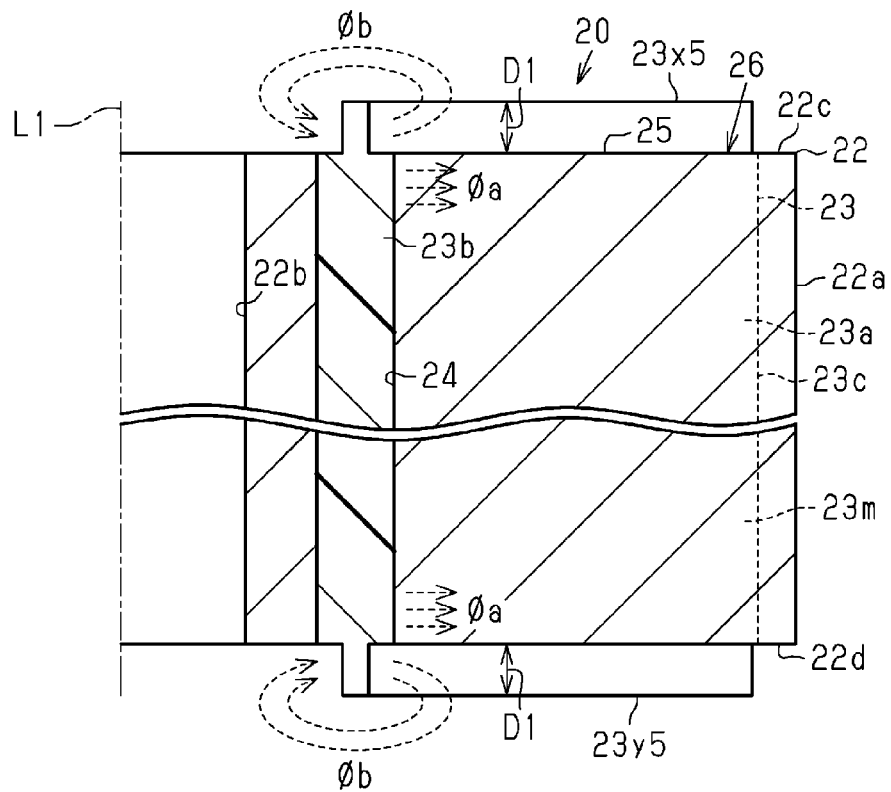
FIG. 20 is a cross-sectional view of a rotor according to another modification.

As shown in FIG. 20, in each of the permanent magnets 23, protruding portions 23x5 and 23y5 having a narrow shape may be formed at a central part of the permanent magnet 23 in the thickness direction thereof. Moreover, the protruding portions 23x5 and 23y5 may be formed continuously along the V-shaped path of the permanent magnet 23. In addition, the protruding portions 23x5 and 23y5 may be formed similarly on both the axial end faces 22c and 22d of the rotor core 22.

Figure 21:
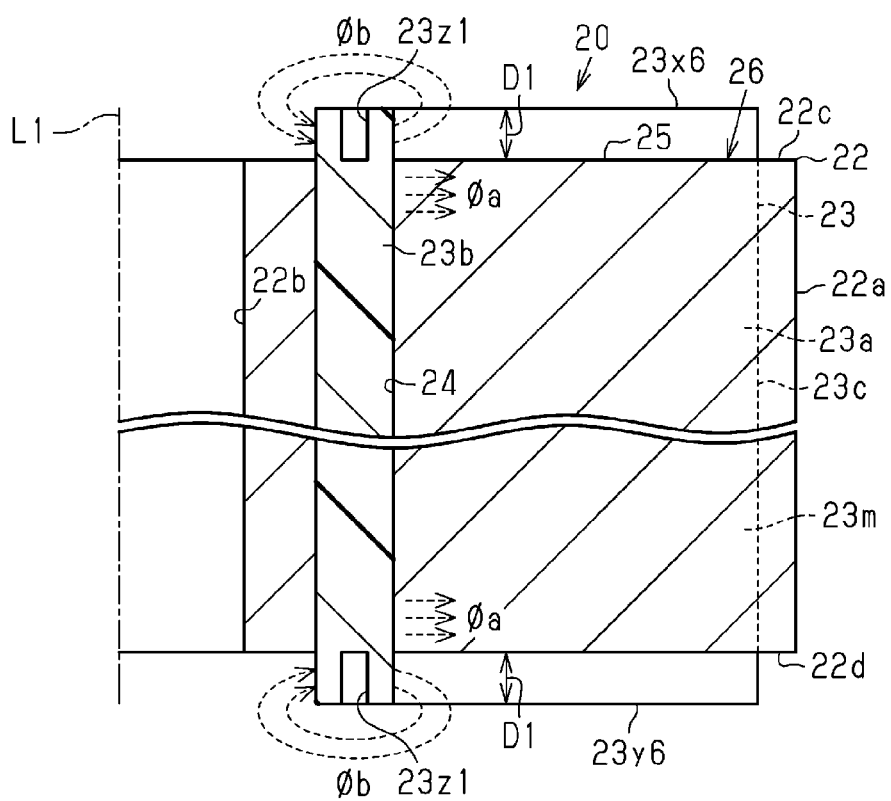
FIG. 21 is a cross-sectional view of a rotor according to another modification.

As shown in FIG. 21, in each of the permanent magnets 23, protruding portions 23x6 and 23y6 may be provided which each have a groove 23z1 formed at a central part thereof in the thickness direction of the permanent magnet 23. The groove 23z1 may have a depth equal to the protruding amount D1 of the protruding portions 23x6 and 23y6. Moreover, the protruding portions 23x6 and 23y6 may be formed continuously along the V-shaped path of the permanent magnet 23. In addition, the protruding portions 23x6 and 23y6 may be formed similarly on both the axial end faces 22c and 22d of the rotor core 22.

Figure 22:
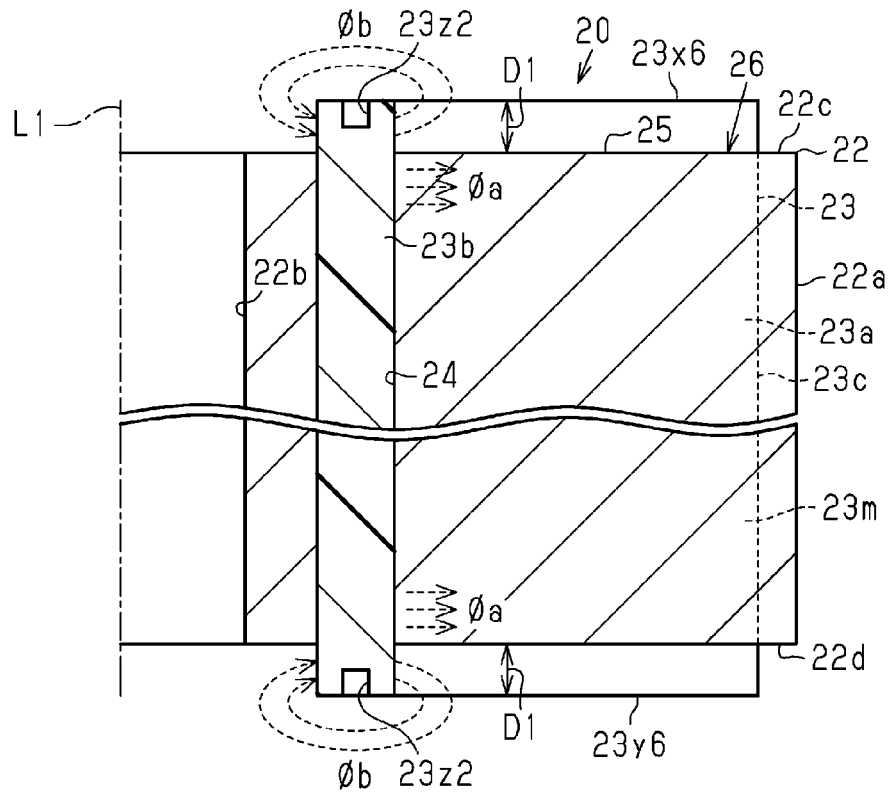
FIG. 22 is a cross-sectional view of a rotor according to another modification.

As shown in FIG. 22, in each of the permanent magnets 23, the depth of grooves 23z2, which are formed respectively at central parts of the protruding portions 23x6 and 23y6 in the thickness direction of the permanent magnet 23, may be set to be different from the protruding amount D1 of the protruding portions 23x6 and 23y6. More specifically, the depth of the grooves 23z2 may be set to be smaller than the protruding amount D1 of the protruding portions 23x6 and 23y6 as shown in FIG. 22, or to be larger than the protruding amount D1 of the protruding portions 23x6 and 23y6.

In this way, advantageous effects can also be achieved such as reduction in the amount of the magnet material required for the permanent magnets 23 and reduction in the weight of the rotor 20.

Moreover, the shape of the protruding portions provided in the permanent magnets 23 may be changed. For example, the protruding amount D1 may vary depending on the parts of the protruding portions.

Figure 23:
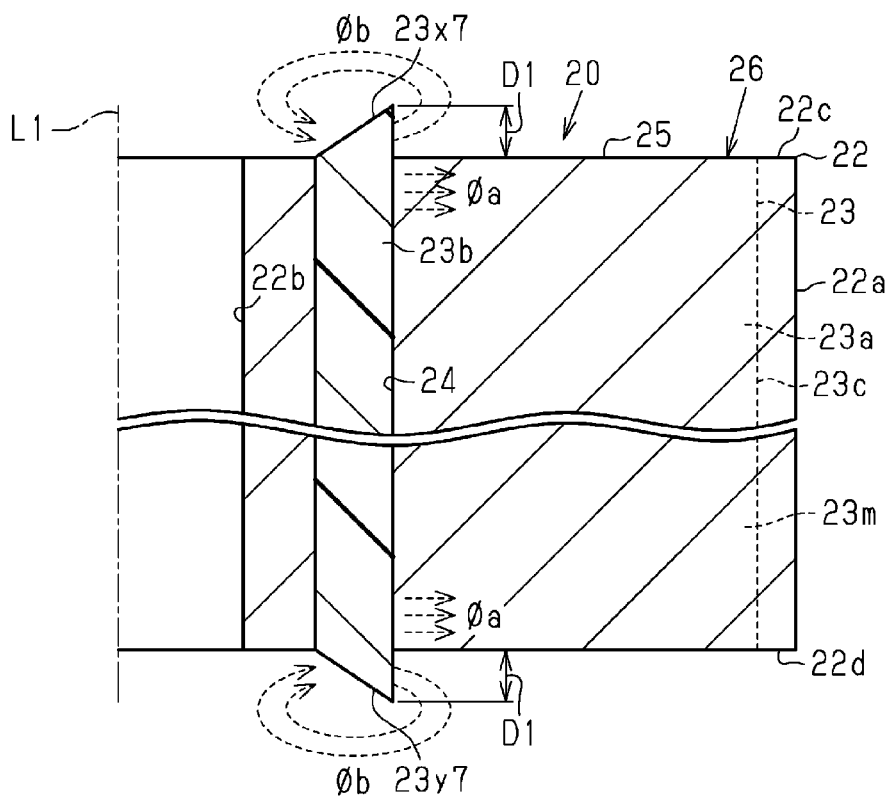
FIG. 23 is a cross-sectional view of a rotor according to another modification.

As shown in FIG. 23, in each of the permanent magnets 23, sloped protruding portions 23x7 and 23y7 may be formed at the curved portion 23b of the permanent magnet 23. Each of the protruding portions 23x7 and 23y7 is sloped so that it is higher on the inner side and lower on the outer side of the V-shape of the permanent magnet 23. In addition, the protruding portions 23x7 and 23y7 may be formed similarly on both the axial end faces 22c and 22d of the rotor core 22.

Figure 24:
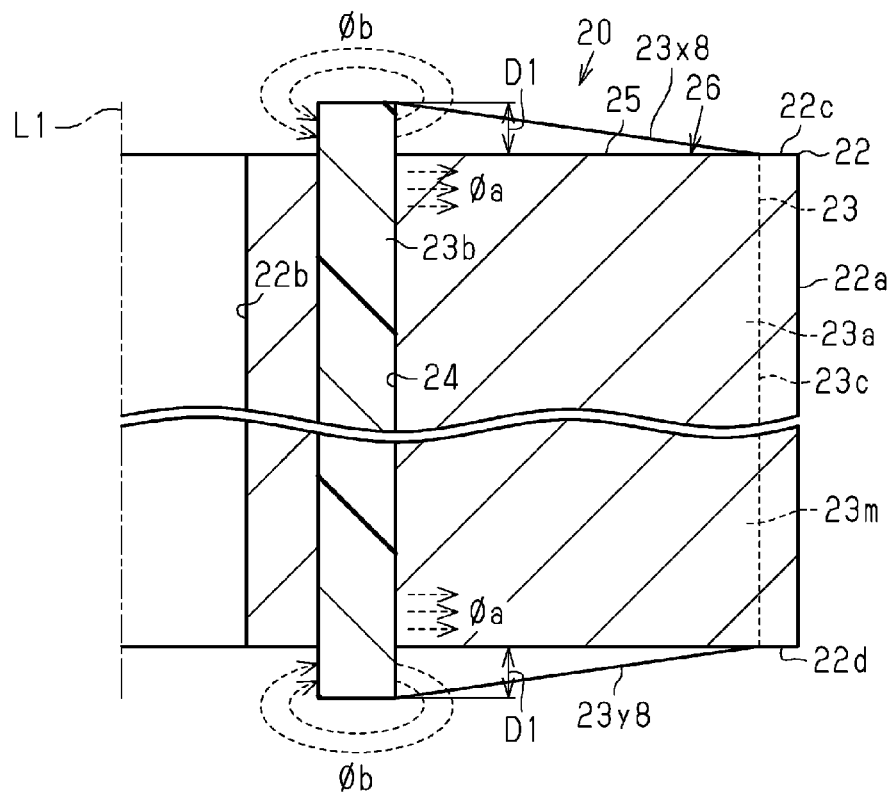
FIG. 24 is a cross-sectional view of a rotor according to another modification.

As shown in FIG. 24, in each of the permanent magnets 23, sloped protruding portions 23x8 and 23y8 may be formed continuously in the extending direction of the V-shaped path of the permanent magnet 23. Each of the protruding portions 23x8 and 23y8 is sloped so that it is highest at the curved portion 23b of the permanent magnet 23 and gradually lowered from the curved portion 23b to the radially outer ends 23c of the straight portions 23a of the permanent magnet 23. In addition, the protruding portions $23x8$ and $23y8$ may be formed similarly on both the axial end faces $22c$ and $22d$ of the rotor core 22.

In this way, advantageous effects can be achieved such as reduction in the amount of the magnet material required for the permanent magnets 23, reduction in the weight of the rotor 20 and increase in the degree of freedom of the external shape of the rotor 20 including the protruding shape of the permanent magnets 23.

Furthermore, protruding portions of the permanent magnets 23 may be formed separately from the embedded magnet portions $23m$ of the permanent magnets 23. In this case, different magnet materials may be used respectively for the protruding portions and the embedded magnet portions $23m$.

Figure 25:
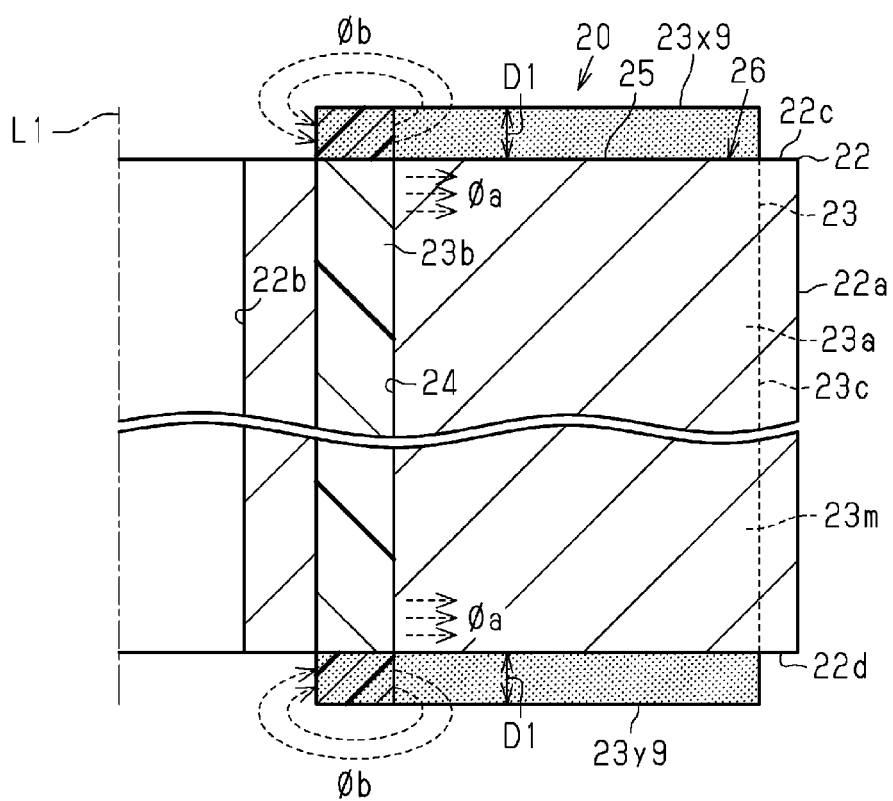
FIG. 25 is a cross-sectional view of a rotor according to another modification.

As shown in FIG. 25, in each of the permanent magnets 23, protruding portions $23x9$ and $23y9$ may be formed continuously in the extending direction of the V-shaped path of the permanent magnet 23 and similarly on both the axial end faces $22c$ and $22d$ of the rotor core 22. The protruding portions $23x9$ and $23y9$ may be formed of a cheaper magnet material than the embedded magnet portion $23m$ of the permanent magnet 23. Moreover, the protruding portions $23x9$ and $23y9$ may be formed of a magnet material whose magnetic force is different from that of the embedded magnet portion $23m$. Furthermore, the protruding portions $23x9$ and $23y9$ may be formed of a magnet material whose strength is different from that of the embedded magnet portion $23m$. Considering the fact that the protruding portions $23x9$ and $23y9$ are exposed from the axial end faces $22c$ and $22d$ of the rotor core 22, it is preferable for the protruding portions $23x9$ and $23y9$ to be formed of a magnet material whose strength is higher than that of the embedded magnet portion $23m$. In addition, the protruding portions $23x9$ and $23y9$ may be formed simultaneously with the embedded magnet portion $23m$ or be retrofitted.

In this way, advantageous effects can be achieved such as increase in the degree of freedom of the configuration of the permanent magnets 23.

Moreover, protruding portions, which protrude from the axial end faces $22c$ and $22d$ of the rotor core 22, are not necessarily provided in all of the permanent magnets 23 arranged in the circumferential direction of the rotor 20.

Figure 26:
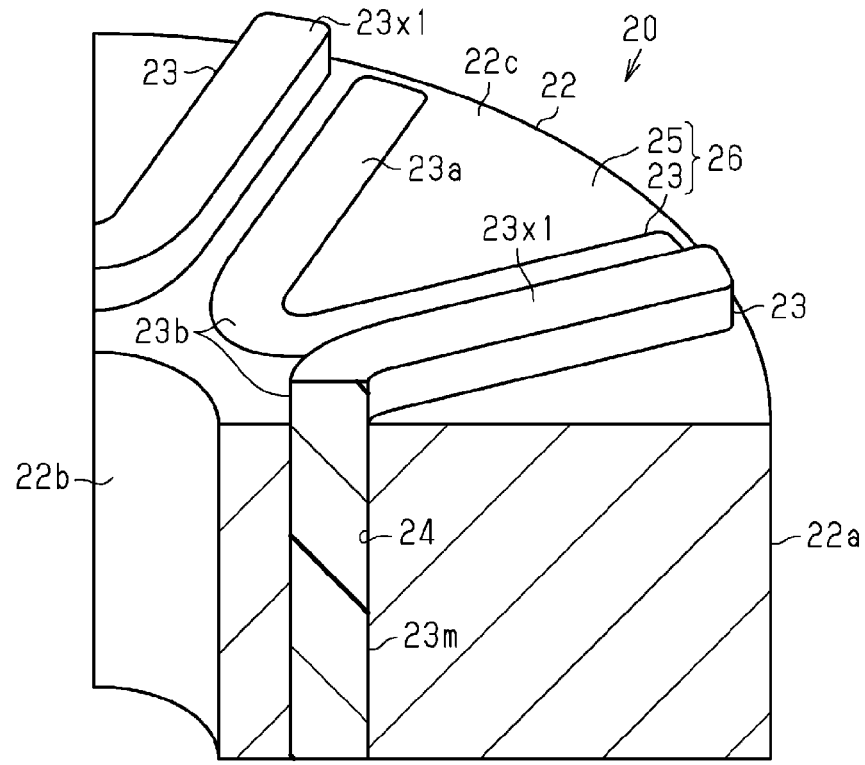
FIG. 26 is a perspective view of a rotor according to another modification.

As shown in FIG. 26, protruding portions $23x1$ may be provided selectively in every other permanent magnet 23 in the plurality of permanent magnets 23 arranged in the circumferential direction. It should be noted that the protruding portions $23x1$ may alternatively be provided at regular intervals other than in every other permanent magnet 23, or at irregular intervals.

In this way, advantageous effects can also be achieved such as reduction in the amount of the magnet material required for the permanent magnets 23 and reduction in the weight of the rotor 20.

Figure 27:
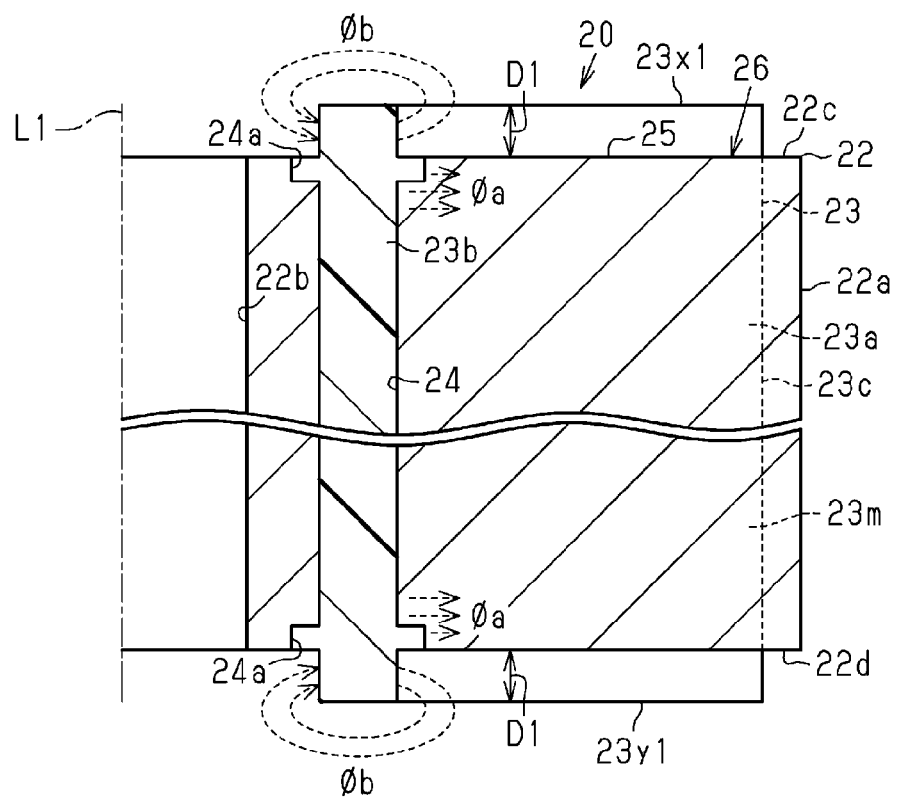
FIG. 27 is a cross-sectional view of a rotor according to another modification.

As shown in FIG. 27, in the axial end faces $22c$ and $22d$ of the rotor core 22, recesses $24a$ may be formed, respectively around openings of the magnet-receiving holes 24, for receiving an excess amount of the magnet material during the forming of the permanent magnets 23 including the protruding portions $23x1$ and $23y1$. In this way, the excess amount of the magnet material can be received in the recesses $24a$; thus, formation of burrs of the permanent magnets 23 on the axial end faces $22c$ and $22d$ of the rotor core 22 can be suppressed.

The shape of the permanent magnets 23 is not limited to the V-shape, but may be other folded shapes (e.g., a U-shape) that are convex inward in the radial direction of the rotor 20. Moreover, the permanent magnets 23 may have other shapes than folded shapes, such as an I-shape.

In the above-described embodiment, the permanent magnets 23 are formed by injection-molding the magnet material into the magnet-receiving holes 24 of the rotor core 22. Alternatively, the permanent magnets 23 may be manufactured in advance and inserted into and fixed in the magnet-receiving holes 24 of the rotor core 22.

In addition to the above modifications, the configuration of the rotor 20 and the configuration of the rotating electric machine M may be further modified as appropriate.

Figure 28:
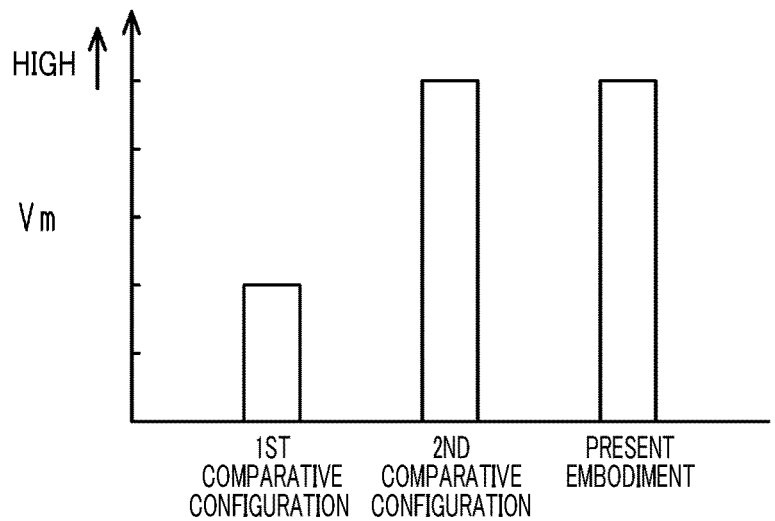
FIG. 28 is an explanatory diagram for explaining the characteristics of the rotor according to the embodiment.

FIG. 28 is a graph comparing a first comparative configuration, a second comparative configuration and the above-described embodiment in terms of the magnitude of the induced voltage Vm generated in the rotating electric machine M. In the above-described embodiment, the axial length of the stator core 11 is set to be equal to the axial length of the rotor core 22. It should be noted that the axial length of the stator core 11 is represented by, for example, the axial length of the distal end surfaces $12a$ of the teeth 12. Moreover, as mentioned in the above-described embodiment, the protruding portions $23x1$ and $23y1$ are formed by setting the axial length of the permanent magnets 23 to be larger than the axial length of the rotor core 22. That is, in the above-described embodiment, the axial length of the permanent magnets 23 is larger than the axial length of both the rotor core 22 and the stator core 11. In addition, the protruding portions $23x1$ and $23y1$ of the permanent magnets 23 are located axially outside the axial end faces of the stator core 11.

In contrast to the above-described embodiment, in the first comparative configuration, the axial length of the permanent magnets 23, the axial length of the rotor core 22 and the axial length of the stator core 11 are set to be equal to each other.

In the second comparative configuration, the axial length of the permanent magnets 23 is set to be equal to the axial length of the rotor core 22. That is, in the second comparative configuration, the permanent magnets 23 have no portions formed to protrude from the magnet-receiving holes 24 in the axial direction. Moreover, in the second comparative configuration, the axial length of the rotor core 22 and thus the axial length of the permanent magnets 23 are set to be larger than the axial length of the stator core 11.

As shown in FIG. 28, the induced voltage Vm is higher in the second comparative configuration and the above-described embodiment than in the first comparative configuration. It is considered that the above result is due to the fact that the entire axial length of the stator core 11 is included in the axial range of the permanent magnets 23 in the second comparative configuration and the above-described embodiment.

Moreover, the magnitude of the induced voltage Vm in the second comparative configuration and the magnitude of the induced voltage Vm in the above-described embodiment are substantially equal to each other. In the above-described embodiment, the axial length of the rotor core 22 is set to be equal to the axial length of the stator core 11; that is, only the axial length of the permanent magnets 23 is set to be larger than the axial length of the stator core 11. Therefore, in the above-described embodiment, the axial length of the rotor core 22 can be reduced as compared with the second comparative configuration. Accordingly, by setting the axial length of the permanent magnets 23 to be larger than the axial lengths of the rotor core 22 and the stator core 11 as in the above-described embodiment, it is possible to reduce the weight of the rotor core 22 and thus the weight of the rotating electric machine M while increasing the induced voltage Vm.

In the above-described embodiment, the rotor core 22 is constituted of a single part. Alternatively, the rotor core 22 may be constituted of a plurality of rotor core segments arranged in alignment with each other in the axial direction. For example, in a modification shown in FIG. 29, the rotor core 22 is constituted of two rotor core segments arranged in alignment with each other in the axial direction. In the following explanation, one of the two rotor core segments will be referred to as the first rotor core segment 31 and the other will be referred to as the second rotor core segment 32. Moreover, in the modification shown in FIG. 29, the same components as those in the above-described embodiment are designated by the same reference signs; and detailed explanation thereof is omitted hereinafter.

Figure 29:
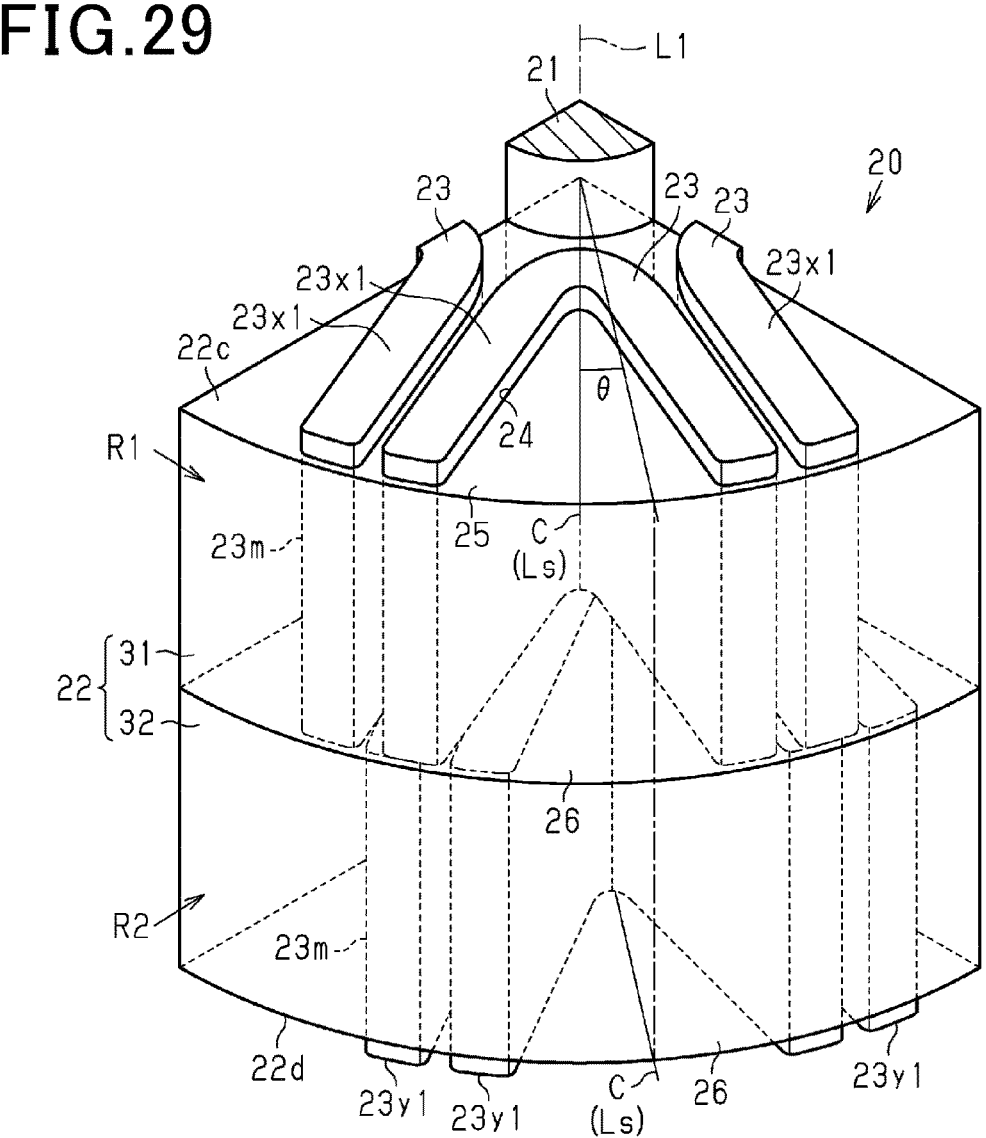
FIG. 29 is a perspective view of a rotor according to a modification.

As shown in FIG. 29, in this modification, the rotor 20 includes a rotating shaft 21, a first rotor segment R1 having the first rotor core segment 31, and a second rotor segment R2 having the second rotor core segment 32.

The first rotor segment R1 and the second rotor segment R2 are arranged in alignment with each other in the direction of an axis L1 of the rotor 20. The first rotor segment R1 and the second rotor segment R2 are configured so that they can rotate together with the rotating shaft 21. The first rotor segment R1 and the second rotor segment R2 are rotatably arranged with respect to the stator 10, with the rotating shaft 21 supported by bearings (not shown) provided in the housing 14.

The first rotor core segment 31 has a substantially cylindrical shape with the rotating shaft 21 inserted in a central part thereof. Similarly, the second rotor core segment 32 also has a substantially cylindrical shape with the rotating shaft 21 inserted in a central part thereof. The first rotor segment R1 has permanent magnets 23 embedded in the first rotor core segment 31. Similarly, the second rotor segment R2 has permanent magnets 23 embedded in the second rotor core segment 32.

The first rotor core segment 31 and the second rotor core segment 32 are identical parts having the same structure. Each of the first rotor core segment 31 and the second rotor core segment 32 is formed of a magnetic metal material. For example, each of the first rotor core segment 31 and the second rotor core segment 32 may be formed by laminating a plurality of magnetic steel sheets in the direction of the axis L1. The first rotor core segment 31 and the second rotor core segment 32 together constitute the rotor core 22 by being arranged in alignment with each other in the axial direction.

Each of the first rotor core segment 31 and the second rotor core segment 32 has the same cross-sectional shape perpendicular to the axis L1 as the rotor core 22 according to the above-described embodiment. That is, each of the first rotor core segment 31 and the second rotor core segment 32 has magnet-receiving holes 24 for receiving the permanent magnets 23 therein. In each of the first rotor core segment 31 and the second rotor core segment 32, the number and shape of the magnet-receiving holes 24 arranged in the circumferential direction are the same as those of the magnet-receiving holes 24 arranged in the circumferential direction in the rotor core 22 according to the above-described embodiment.

In each of the first rotor core segment 31 and the second rotor core segment 32, those portions which are located on the inner side of the folded substantially V-shape of the permanent magnets 23 and radially outside the permanent magnets 23 function as outer core portions 25 facing the stator 10 to generate reluctance torque. Each of the first rotor segment R1 and the second rotor segment R2 has eight rotor magnetic poles 26 each including one of the permanent magnets 23 and one of the outer core portions 25. The rotor magnetic poles 26 function as N poles and S poles alternately in the circumferential direction.

In each of the first rotor segment R1 and the second rotor segment R2, each of the rotor magnetic poles 26 has a magnetic-pole center C in the circumferential direction. The magnetic-pole centers C of the rotor magnetic poles 26 are set at equal intervals in the circumferential direction. More particularly, in this modification, the magnetic-pole centers C of the eight rotor magnetic poles 26 are set at intervals of 45° in the circumferential direction. In addition, in each of the rotor magnetic poles 26, the magnetic-pole center C coincides with the circumferential centerline Ls of the permanent magnet 23.

The rotor magnetic poles 26 of the second rotor segment R2 are circumferentially offset from the rotor magnetic poles 26 of the first rotor segment R1. More particularly, in this modification, the first rotor segment R1 and the second rotor segment R2 have the same configuration; and the rotor 20 is configured by rotating the second rotor segment R2 by a predetermined angle with respect to the first rotor segment R1. Consequently, the magnetic-pole centers C of the second rotor segment R2 are circumferentially offset by the predetermined angle from the magnetic-pole centers C of the first rotor segment R1. Hereinafter, the circumferential offset angle of the magnetic-pole centers C of the second rotor segment R2 with respect to the magnetic-pole centers C of the first rotor segment R1 will be referred to as the skew angle θ.

In this modification, the skew angle θ is set based on the following Equation (a), where p is the number of poles of the rotor 20 and L is the least common multiple of the number of poles p and the number of slots of the stator 10.

$$\theta = 180/L \tag{a}$$

The number of poles p of the rotor 20 is equal to the number of the rotor magnetic poles 26 in each of the first rotor segment R1 and the second rotor segment R2, and set to 8 in this modification. Moreover, the number of slots of the stator 10 is set to 12 in this modification. That is, in this modification, the skew angle θ is set to 7.5° that is obtained by substituting p=8 and L=24 into the above Equation (a).

Figure 30:
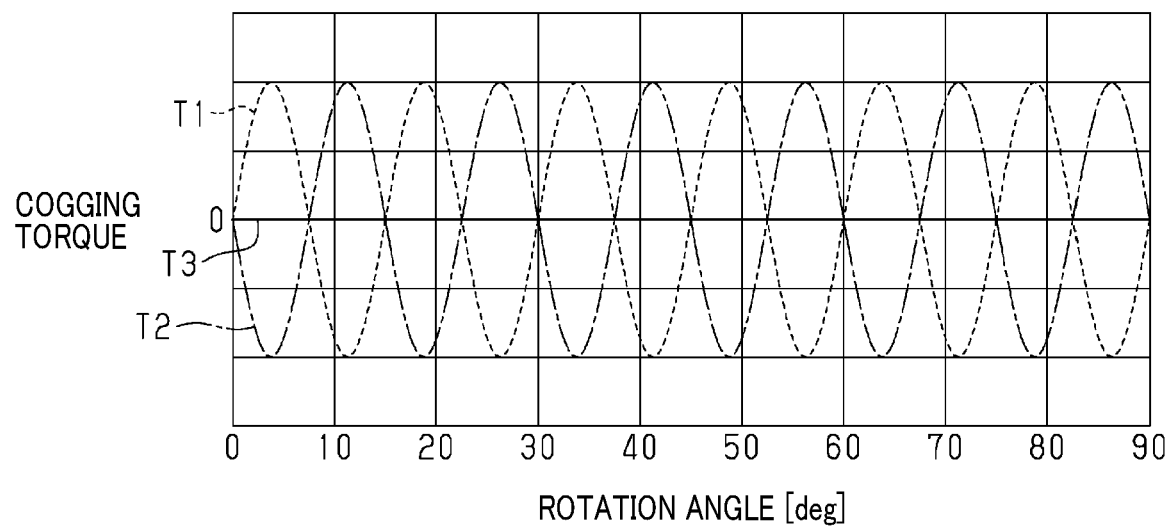
FIG. 30 is an explanatory diagram for explaining the characteristics of the rotor according to the modification shown in FIG. 29.

FIG. 30 illustrates the relationship between the rotation angle of the rotor 20 and the magnitude of cogging torque in the case of the skew angle θ being set to 7.5°. In FIG. 30, T1 represents the cogging torque generated in the first rotor segment R1; T2 represents the cogging torque generated in the second rotor segment R2; and T3 represents the total cogging torque generated in the entire rotor 20 which is the resultant cogging torque of T1 and T2. As can be seen from FIG. 30, in the case of the skew angle θ being set to 7.5°, the cogging torque T1 and the cogging torque T2 have mutually opposite phases. Consequently, the cogging torques T1 and T2 are canceled by each other, thereby reducing the total cogging torque T3. As above, in this modification, by circumferentially offsetting the magnetic-pole centers C of the first rotor segment R1 and the magnetic-pole centers C of the second rotor segment R2 from each other, it becomes possible to reduce the total cogging torque T3 of the rotor 20. It should be noted that the value of the skew angle θ is not limited to 7.5°, but may be changed as appropriate according to the configuration of the rotating electric machine M.

In this modification, the rotor 20 also has protruding portions 23x1 and 23y1, which are end portions of the permanent magnets 23 protruding from the rotor core 22 in the axial direction, as in the above-described embodiment. Specifically, the protruding portions 23x1 protrude from one axial end face 22c of the rotor core 22. In this modification, the axial end face 22c of the rotor core 22 is that one of axial end faces of the first rotor core segment 31 which is on the opposite side to the second rotor segment R2. Moreover, the protruding portions 23x1 are end portions of the permanent magnets 23 of the first rotor segment R1. On the other hand, the protruding portions 23y1 protrude from the other axial end face 22d of the rotor core 22. In this modification, the axial end face 22d of the rotor core 22 is that one of axial end faces of the second rotor core segment 32 which is on the opposite side to the first rotor segment R1. Moreover, the protruding portions 23y1 are end portions of the permanent magnets 23 of the second rotor segment R2.

In the first rotor core segment 31, the permanent magnets 23 do not protrude from the axial end face on the opposite side to the axial end face 22c on which the protruding portions 23x1 are located. Similarly, in the second rotor core segment 32, the permanent magnets 23 do not protrude from the axial end face on the opposite side to the axial end face 22d on which the protruding portions 23y1 are located. Moreover, the first rotor core segment 31 and the second rotor core segment 32 are arranged in alignment with each other in the axial direction such that their respective axial end faces, from which the permanent magnets 23 do not protrude, face each other in the axial direction. More particularly, in this modification, the first rotor core segment 31 and the second rotor core segment 32 are arranged in alignment with each other in the axial direction such that their respective axial end faces, from which the permanent magnets 23 do not protrude, are in contact with each other.

In this modification, it is also possible to achieve the same advantageous effects as achievable by the protruding portions 23x1 and 23y in the above-described embodiment.

In addition, as described above, in this modification, the axial end faces of the first rotor core segment 31 and the second rotor core segment 32, from which the permanent magnets 23 do not protrude, are arranged in contact with each other. Alternatively, the axial end faces of the first rotor core segment 31 and the second rotor core segment 32, from which the permanent magnets 23 do not protrude, may be arranged with a gap formed therebetween. Moreover, the permanent magnets 23 may be configured to protrude also from the mutually-facing axial end faces of the first rotor core segment 31 and the second rotor core segment 32.

What is claimed is:

1. A rotor having a permanent magnet embedded in a magnet-receiving hole of a rotor core,
wherein:
the rotor core has axial end faces formed as flat surfaces;
the permanent magnet has protruding portions that protrude respectively from the axial end faces of the rotor core;
the permanent magnet also has a pair of straight portions and a curved portion that connects radially inner ends of the pair of straight portions;
a thickness of the curved portion is smaller than a thickness of the pair of straight portions;
the protruding portions of the permanent magnet are provided in only part of the permanent magnet in an extending direction of the permanent magnet along the axial end faces of the rotor core; and
the protruding portions of the permanent magnet are provided in only the curved portion of the permanent magnet.

2. The rotor as set forth in claim 1, wherein the permanent magnet has a folded shape that is convex inward in a radial direction of the rotor.

3. The rotor as set forth in claim 1, wherein
the protruding portions of the permanent magnet have a same protruding shape from the axial end faces of the rotor core on both axial sides of the rotor core.

4. The rotor as set forth in claim 1, wherein
the protruding portions of the permanent magnet have different protruding shapes from the respective axial end faces of the rotor core.

5. The rotor as set forth in claim 1, wherein
the protruding portions of the permanent magnet are provided partially in a thickness direction of the permanent magnet perpendicular to the extending direction of the permanent magnet along the axial end faces of the rotor core.

6. The rotor as set forth in claim 1, wherein
the protruding portions of the permanent magnet have a constant protruding amount from the respective axial end faces of the rotor core.

7. The rotor as set forth in claim 1, wherein
the protruding portions of the permanent magnet have protruding amounts from the respective axial end faces of the rotor core which vary depending on parts of the protruding portions.

8. The rotor as set forth in claim 1, wherein
the protruding portions of the permanent magnet are formed continuously and integrally with an embedded magnet portion of the permanent magnet which is located in the magnet-receiving hole of the rotor core.

9. The rotor as set forth in claim 1, wherein
the protruding portions of the permanent magnet are formed separately from an embedded magnet portion of the permanent magnet which is located in the magnet-receiving hole of the rotor core.

10. The rotor as set forth in claim 1, wherein:
a plurality of permanent magnets are arranged in a circumferential direction of the rotor; and
the protruding portions are provided in all the permanent magnets arranged in the circumferential direction of the rotor.

11. The rotor as set forth in claim 1, wherein:
a plurality of permanent magnets are arranged in a circumferential direction of the rotor; and
the protruding portions are provided selectively in some of the permanent magnets arranged in the circumferential direction of the rotor.

12. The rotor as set forth in claim 1, wherein
the permanent magnet is formed of a magnet material that is filled and solidified in the magnet-receiving hole of the rotor core.

13. The rotor as set forth in claim 1, wherein:
the rotor comprises a plurality of rotor segments arranged in alignment with each other in an axial direction of the rotor;
each of the rotor segments comprises a rotor core segment and the permanent magnet embedded in the rotor core segment;
the rotor core segments of the rotor segments together constitute the rotor core of the rotor; and
magnetic-pole centers of one of the rotor segments are circumferentially offset from magnetic-pole centers of another of the rotor segments.

14. A rotating electric machine comprising:
a rotor having a permanent magnet embedded in a magnet-receiving hole of a rotor core; and
a stator configured to apply a rotating magnetic field to the rotor,
wherein:
the rotor core has axial end faces formed as flat surfaces;
the permanent magnet has protruding portions that protrude respectively from the axial end faces of the rotor core;
the permanent magnet also has a pair of straight portions and a curved portion that connects radially inner ends of the pair of straight portions;
a thickness of the curved portion is smaller than a thickness of the pair of straight portions;
the protruding portions of the permanent magnet are provided in only part of the permanent magnet in an extending direction of the permanent magnet along the axial end faces of the rotor core;
the protruding portions of the permanent magnet are provided in only the curved portion of the permanent magnet.

15. The rotating electric machine as set forth in claim 14, wherein:
the rotor comprises a plurality of rotor segments arranged in alignment with each other in an axial direction of the rotor;
each of the rotor segments comprises a rotor core segment and the permanent magnet embedded in the rotor core segment;
the rotor core segments of the rotor segments together constitute the rotor core of the rotor; and
magnetic-pole centers of one of the rotor segments are circumferentially offset from magnetic-pole centers of another of the rotor segments.

* * * * *